(12) United States Patent
Mehta et al.

(10) Patent No.: US 9,900,295 B2
(45) Date of Patent: Feb. 20, 2018

(54) ROAMING CONTENT WIPE ACTIONS ACROSS DEVICES

(71) Applicant: Microsoft Technology Licensing, LLC, Redmond, WA (US)

(72) Inventors: Yogesh A. Mehta, Redmond, WA (US); Octavian T. Ureche, Bellevue, WA (US); Preston Derek Adam, Woodinville, WA (US); Narendra S. Acharya, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/533,921

(22) Filed: Nov. 5, 2014

(65) Prior Publication Data

US 2016/0127327 A1 May 5, 2016

(51) Int. Cl.
*H04L 29/06* (2006.01)
*H04L 29/08* (2006.01)
*G06F 21/62* (2013.01)

(52) U.S. Cl.
CPC .......... *H04L 63/06* (2013.01); *G06F 21/6209* (2013.01); *H04L 63/0428* (2013.01); *H04L 63/20* (2013.01); *H04L 67/1097* (2013.01)

(58) Field of Classification Search
CPC . H04L 63/0428; H04L 67/1097; H04L 63/06; H04L 63/20; G06F 21/6209
See application file for complete search history.

(56) References Cited

U.S. PATENT DOCUMENTS

| 5,495,533 A | 2/1996 | Linehan et al. |
| 5,787,131 A | 7/1998 | Bottomley |
| 5,897,661 A | 4/1999 | Baranovsky et al. |
| 5,944,783 A | 8/1999 | Nieten |

(Continued)

FOREIGN PATENT DOCUMENTS

| CN | 1653422 | 8/2005 |
| CN | 1713756 | 12/2005 |

(Continued)

OTHER PUBLICATIONS

"About EFS (Encrypting File System)", Available at: https://www.elcomsoft.com/help/en/aefsdr/about_efs.html, Oct. 28, 2014, 3 pages.

(Continued)

*Primary Examiner* — Techane Gergiso
*Assistant Examiner* — Thomas Ho

(57) ABSTRACT

Content on a device is encrypted and protected based on a data protection key. The protected content can then be copied to cloud storage, and from the cloud storage the protected content can be transferred to various other ones of the user's devices. A key used to retrieve plaintext content from the protected content is associated with an identifier of a particular device that provides the key, the device providing the key being the device that generated the key, or another managed device to which the protected content was transferred. A wipe command can similarly be transferred to the various ones of the user's devices, causing any keys associated with a particular device to be deleted from each of the various ones of the user's devices.

20 Claims, 10 Drawing Sheets

(56) References Cited

U.S. PATENT DOCUMENTS

| | | | |
|---|---|---|---|
| 5,966,263 A | 10/1999 | Freitas et al. | |
| 5,974,503 A | 10/1999 | Venkatesh et al. | |
| 6,016,402 A | 1/2000 | Thomas et al. | |
| 6,028,725 A | 2/2000 | Blumenau | |
| 6,041,386 A | 3/2000 | Bello | |
| 6,067,199 A | 5/2000 | Blumenau | |
| 6,076,143 A | 6/2000 | Blumenau | |
| 6,134,062 A | 10/2000 | Blumenau | |
| 6,151,665 A | 11/2000 | Blumenau | |
| 6,170,037 B1 | 1/2001 | Blumenau | |
| 6,170,055 B1 | 1/2001 | Meyer et al. | |
| 6,253,300 B1 | 6/2001 | Lawrence et al. | |
| 6,292,317 B1 | 9/2001 | Alexander | |
| 6,292,790 B1 | 9/2001 | Krahn et al. | |
| 6,550,011 B1 | 4/2003 | Sims, III | |
| 6,665,784 B2 | 12/2003 | Ihde et al. | |
| 6,727,896 B2 | 4/2004 | Tsang | |
| 6,728,379 B1 | 4/2004 | Ishibashi et al. | |
| 6,789,162 B1 | 9/2004 | Talagala et al. | |
| 6,944,742 B1 | 9/2005 | Shoff et al. | |
| 6,968,973 B2 | 11/2005 | Uyttendaele et al. | |
| 6,996,696 B2 | 2/2006 | Shoff et al. | |
| 7,197,638 B1 | 3/2007 | Grawrock et al. | |
| 7,356,662 B2 | 4/2008 | Shoff et al. | |
| 7,360,073 B1 | 4/2008 | Billstrom et al. | |
| 7,380,140 B1 | 5/2008 | Weissman et al. | |
| 7,382,883 B2 | 6/2008 | Cross et al. | |
| 7,409,623 B2 | 8/2008 | Baker et al. | |
| 7,451,484 B1 | 11/2008 | Nadalin et al. | |
| 7,536,536 B1 | 5/2009 | Joshi et al. | |
| 7,559,088 B2 | 7/2009 | Cohen et al. | |
| 7,580,950 B2 | 8/2009 | Kavuri et al. | |
| 7,594,087 B2 | 9/2009 | Zeevi et al. | |
| 7,646,380 B2 | 1/2010 | Tsang | |
| 7,694,134 B2 | 4/2010 | Witt et al. | |
| 7,711,923 B2 | 5/2010 | Rogers et al. | |
| 7,725,703 B2 | 5/2010 | Hunter et al. | |
| 7,757,100 B2 | 7/2010 | Weissman et al. | |
| 7,849,254 B2 | 12/2010 | Ash et al. | |
| 7,890,664 B1 | 2/2011 | Tao et al. | |
| 7,903,549 B2 | 3/2011 | Judge et al. | |
| 7,930,540 B2 | 4/2011 | Ahuja et al. | |
| 7,962,739 B2 | 6/2011 | Childs et al. | |
| 7,979,626 B2 | 7/2011 | Rogers | |
| 8,046,365 B2 | 10/2011 | Saito | |
| 8,046,533 B2 | 10/2011 | Kompella et al. | |
| 8,085,933 B2 | 12/2011 | Ferguson | |
| 8,214,656 B1 | 7/2012 | Plotkin et al. | |
| 8,234,477 B2 | 7/2012 | Shaath | |
| 8,249,257 B2 | 8/2012 | Brutch et al. | |
| 8,321,688 B2 | 11/2012 | Auradkar et al. | |
| 8,341,427 B2 | 12/2012 | Auradkar et al. | |
| 8,341,430 B2 | 12/2012 | Ureche et al. | |
| 8,387,109 B2 | 2/2013 | Ureche et al. | |
| 8,411,863 B2 | 4/2013 | Ureche et al. | |
| 8,416,954 B1 | 4/2013 | Raizen et al. | |
| 8,417,973 B2 | 4/2013 | Cooper et al. | |
| 8,423,792 B2 | 4/2013 | Luciani et al. | |
| 8,458,490 B2 | 6/2013 | Konetski et al. | |
| 8,527,561 B1 | 9/2013 | Moody, II et al. | |
| 8,538,919 B1 | 9/2013 | Nielsen et al. | |
| 8,549,271 B1 | 10/2013 | Joshi et al. | |
| 8,583,879 B2 | 11/2013 | Na et al. | |
| 8,588,422 B2 | 11/2013 | Beachem et al. | |
| 8,625,802 B2 | 1/2014 | Parann-Nissany | |
| 8,661,193 B1 | 2/2014 | Cobos et al. | |
| 8,667,213 B2 | 3/2014 | Rogers et al. | |
| 8,689,279 B2 | 4/2014 | Basmov et al. | |
| 8,726,343 B1* | 5/2014 | Borzycki | G06F 21/6218 709/203 |
| 8,726,407 B2 | 5/2014 | Etchegoyen | |
| 8,769,305 B2 | 7/2014 | Blaisdell | |
| 8,874,935 B2 | 10/2014 | Basmov et al. | |
| 8,875,304 B2 | 10/2014 | Celi, Jr. et al. | |
| 9,323,465 B2 | 4/2016 | Flynn et al. | |
| 9,369,289 B1 | 6/2016 | Harrison et al. | |
| 9,430,664 B2 | 8/2016 | Adam et al. | |
| 9,477,614 B2 | 10/2016 | Basmov et al. | |
| 9,537,656 B2 | 1/2017 | Debout et al. | |
| 9,740,639 B2 | 8/2017 | Basmov et al. | |
| 9,825,945 B2 | 11/2017 | Adam et al. | |
| 9,853,812 B2 | 12/2017 | Mehta et al. | |
| 9,853,820 B2 | 12/2017 | Adam et al. | |
| 2001/0000265 A1 | 4/2001 | Schreiber et al. | |
| 2002/0019935 A1 | 2/2002 | Andrew et al. | |
| 2003/0081784 A1 | 5/2003 | Kallahalla et al. | |
| 2003/0084298 A1 | 5/2003 | Messerges et al. | |
| 2003/0196114 A1 | 10/2003 | Brew et al. | |
| 2003/0221095 A1 | 11/2003 | Gaunt et al. | |
| 2004/0044912 A1 | 3/2004 | Connary et al. | |
| 2004/0090811 A1 | 5/2004 | Kang | |
| 2004/0146015 A1 | 7/2004 | Cross et al. | |
| 2004/0174345 A1 | 9/2004 | Tsang | |
| 2005/0071280 A1* | 3/2005 | Irwin | H04L 9/0825 705/59 |
| 2005/0091661 A1 | 4/2005 | Kurien et al. | |
| 2005/0097341 A1 | 5/2005 | Francis et al. | |
| 2005/0213377 A1 | 9/2005 | Shoff et al. | |
| 2005/0262361 A1 | 11/2005 | Thibadeau | |
| 2005/0265074 A1 | 12/2005 | Shoff et al. | |
| 2005/0283730 A1 | 12/2005 | Uyttendaele et al. | |
| 2006/0101027 A1 | 5/2006 | Hotchkiss | |
| 2006/0155919 A1 | 7/2006 | Lasser et al. | |
| 2006/0190984 A1 | 8/2006 | Heard et al. | |
| 2006/0206507 A1 | 9/2006 | Dahbour | |
| 2006/0277590 A1 | 12/2006 | Limont et al. | |
| 2006/0279556 A1 | 12/2006 | Tsang | |
| 2007/0028231 A1 | 2/2007 | Kelso et al. | |
| 2007/0058806 A1 | 3/2007 | Ferguson | |
| 2007/0150886 A1 | 6/2007 | Shapiro | |
| 2007/0244940 A1 | 10/2007 | Devarakonda et al. | |
| 2007/0250678 A1 | 10/2007 | Ueoka et al. | |
| 2007/0300008 A1 | 12/2007 | Rogers et al. | |
| 2007/0300037 A1 | 12/2007 | Rogers et al. | |
| 2008/0002830 A1 | 1/2008 | Cherkasov et al. | |
| 2008/0005467 A1 | 1/2008 | Morley et al. | |
| 2008/0010468 A1 | 1/2008 | Ruiz | |
| 2008/0082448 A1 | 4/2008 | Meijer et al. | |
| 2008/0083036 A1 | 4/2008 | Ozzie et al. | |
| 2008/0107262 A1 | 5/2008 | Helfman et al. | |
| 2008/0130156 A1 | 6/2008 | Chu et al. | |
| 2008/0141040 A1 | 6/2008 | Biddle et al. | |
| 2008/0155316 A1 | 6/2008 | Pawar et al. | |
| 2008/0168315 A1 | 7/2008 | Mead et al. | |
| 2008/0229428 A1 | 9/2008 | Camiel | |
| 2008/0240253 A1 | 10/2008 | Au et al. | |
| 2008/0240441 A1 | 10/2008 | Kawakami | |
| 2008/0263371 A1 | 10/2008 | Weissman et al. | |
| 2008/0301470 A1 | 12/2008 | Green et al. | |
| 2009/0024795 A1 | 1/2009 | Kobara | |
| 2009/0063756 A1 | 3/2009 | Asipov | |
| 2009/0075630 A1 | 3/2009 | McLean | |
| 2009/0132474 A1 | 5/2009 | Ma et al. | |
| 2009/0205012 A1 | 8/2009 | Jain et al. | |
| 2009/0210267 A1 | 8/2009 | Fish et al. | |
| 2009/0287874 A1 | 11/2009 | Rogers et al. | |
| 2009/0307563 A1 | 12/2009 | Marquez et al. | |
| 2010/0082898 A1 | 4/2010 | Mangold et al. | |
| 2010/0100721 A1 | 4/2010 | Su et al. | |
| 2010/0107213 A1 | 4/2010 | Ureche et al. | |
| 2010/0169948 A1 | 7/2010 | Budko et al. | |
| 2010/0250847 A1 | 9/2010 | Chen | |
| 2010/0266132 A1 | 10/2010 | Bablani et al. | |
| 2010/0299152 A1 | 11/2010 | Batchu et al. | |
| 2010/0306175 A1 | 12/2010 | Johnson et al. | |
| 2010/0332725 A1 | 12/2010 | Post et al. | |
| 2011/0010760 A1 | 1/2011 | Etchegoyen | |
| 2011/0035577 A1 | 2/2011 | Lin et al. | |
| 2011/0055559 A1 | 3/2011 | Li et al. | |
| 2011/0055560 A1 | 3/2011 | Meissner et al. | |
| 2011/0060915 A1 | 3/2011 | Tal | |
| 2011/0078760 A1 | 3/2011 | De Perthuis | |
| 2011/0087890 A1 | 4/2011 | Munsil et al. | |
| 2011/0154023 A1 | 6/2011 | Smith et al. | |

(56) References Cited

U.S. PATENT DOCUMENTS

| | | |
|---|---|---|
| 2011/0202916 A1 | 8/2011 | VoBa et al. |
| 2011/0225431 A1 | 9/2011 | Stufflebeam, Jr. et al. |
| 2011/0225640 A1 | 9/2011 | Ganapathy et al. |
| 2011/0246785 A1 | 10/2011 | Linsley et al. |
| 2011/0247047 A1 | 10/2011 | Loureiro et al. |
| 2011/0252232 A1 | 10/2011 | De Atley et al. |
| 2011/0264925 A1 | 10/2011 | Russo et al. |
| 2011/0276683 A1 | 11/2011 | Goldschlag et al. |
| 2011/0277013 A1 | 11/2011 | Chinta |
| 2012/0017095 A1 | 1/2012 | Blenkhorn et al. |
| 2012/0036347 A1 | 2/2012 | Swanson et al. |
| 2012/0036370 A1 | 2/2012 | Lim et al. |
| 2012/0079603 A1 | 3/2012 | Brown et al. |
| 2012/0087033 A1 | 4/2012 | Yang |
| 2012/0110345 A1 | 5/2012 | Pigeon et al. |
| 2012/0159148 A1 | 6/2012 | Behren et al. |
| 2012/0173882 A1 | 7/2012 | Horn et al. |
| 2012/0239618 A1 | 9/2012 | Kung |
| 2012/0297190 A1 | 11/2012 | Shen et al. |
| 2012/0331550 A1 | 12/2012 | Raj et al. |
| 2013/0013856 A1 | 1/2013 | Rogers et al. |
| 2013/0054977 A1 | 2/2013 | Basmov |
| 2013/0054979 A1 | 2/2013 | Basmov |
| 2013/0061035 A1 | 3/2013 | Hook et al. |
| 2013/0067242 A1 | 3/2013 | Lyakhovitskiy et al. |
| 2013/0074142 A1 | 3/2013 | Brennan et al. |
| 2013/0086691 A1 | 4/2013 | Fielder |
| 2013/0091543 A1 | 4/2013 | Wade et al. |
| 2013/0117561 A1 | 5/2013 | Chawla et al. |
| 2013/0117805 A1 | 5/2013 | Kent et al. |
| 2013/0124859 A1* | 5/2013 | Pestoni .............. H04L 9/0825 713/163 |
| 2013/0138971 A1 | 5/2013 | Budko et al. |
| 2013/0198474 A1 | 8/2013 | Shaath |
| 2013/0208893 A1 | 8/2013 | Shablygin et al. |
| 2013/0283392 A1* | 10/2013 | Mirashrafi .............. G06F 21/10 726/26 |
| 2013/0291055 A1 | 10/2013 | Muppidi et al. |
| 2013/0318359 A1 | 11/2013 | Morris et al. |
| 2014/0007182 A1 | 1/2014 | Qureshi et al. |
| 2014/0007222 A1 | 1/2014 | Qureshi et al. |
| 2014/0019753 A1 | 1/2014 | Lowry et al. |
| 2014/0032691 A1 | 1/2014 | Barton et al. |
| 2014/0032759 A1 | 1/2014 | Barton et al. |
| 2014/0032933 A1 | 1/2014 | Smith et al. |
| 2014/0059690 A1 | 2/2014 | Li et al. |
| 2014/0075493 A1 | 3/2014 | Krishnan et al. |
| 2014/0081980 A1 | 3/2014 | Aad |
| 2014/0109178 A1 | 4/2014 | Barton et al. |
| 2014/0156705 A1 | 6/2014 | Beecham et al. |
| 2014/0156706 A1 | 6/2014 | Beecham et al. |
| 2014/0164774 A1 | 6/2014 | Nord et al. |
| 2014/0181512 A1 | 6/2014 | Spalka et al. |
| 2014/0230007 A1 | 8/2014 | Roth et al. |
| 2014/0259117 A1 | 9/2014 | Wachendorf et al. |
| 2014/0344570 A1* | 11/2014 | Adam .............. H04L 63/0428 713/165 |
| 2014/0344571 A1* | 11/2014 | Adam .............. G06F 21/6218 713/165 |
| 2014/0359793 A1 | 12/2014 | Dobson et al. |
| 2015/0033039 A1 | 1/2015 | Basmov et al. |
| 2015/0052610 A1 | 2/2015 | Thom et al. |
| 2015/0160879 A1 | 6/2015 | Flynn et al. |
| 2015/0186657 A1 | 7/2015 | Nakhjiri |
| 2015/0270956 A1 | 9/2015 | Basmov et al. |
| 2015/0278531 A1 | 10/2015 | Smith et al. |
| 2016/0072796 A1 | 3/2016 | Adam et al. |
| 2016/0080149 A1 | 3/2016 | Mehta et al. |
| 2016/0154744 A1 | 6/2016 | Zheng et al. |
| 2016/0173281 A1 | 6/2016 | White et al. |
| 2016/0255079 A1 | 9/2016 | Harrison et al. |
| 2016/0283406 A1 | 9/2016 | Linga et al. |
| 2017/0004094 A1 | 1/2017 | Basmov et al. |
| 2017/0005809 A1 | 1/2017 | Adam et al. |
| 2017/0104768 A1 | 4/2017 | Semenko et al. |

FOREIGN PATENT DOCUMENTS

| | | |
|---|---|---|
| CN | 102646077 | 8/2012 |
| CN | 103092664 | 5/2013 |
| CN | 103092938 | 5/2013 |
| CN | 103500116 | 1/2014 |
| CN | 103577567 | 2/2014 |
| EP | 2393033 | 12/2011 |
| EP | 2448303 | 5/2012 |
| EP | 2509275 | 10/2012 |
| EP | 2562675 | 2/2013 |
| EP | 2680487 | 1/2014 |
| TW | 200519595 | 6/2005 |
| TW | 200723093 | 6/2007 |
| TW | 201032559 | 9/2010 |
| TW | I540453 | 7/2016 |
| WO | WO-0049488 | 8/2000 |
| WO | WO-2004034184 | 4/2004 |
| WO | WO-2004107646 | 12/2004 |
| WO | WO-2009069043 | 6/2009 |
| WO | WO-2009149019 | 12/2009 |
| WO | WO-2012016091 | 2/2012 |
| WO | WO-2012167392 | 12/2012 |

OTHER PUBLICATIONS

"Application Encryption—Vormetric Data Security Products", Available at: http://www.vormetric.com/products/vormetric-application-encryption, Jun. 27, 2014, 6 pages.

"Approaches for Encryption of Data at Rest in the Enterprise", In White Papers, 2008, 24 pages.

"BitLocker Drive Encryption in Windows Vista", Microsoft TechNet, retrieved from <http://technet.microsoft.com/en-us/library/cc725719(WS.10).aspx> on Apr. 25, 2011, Aug. 6, 2010, 9 pages.

"CheckVision Enterprise Encryption", Available at: http://assets1.csc.com/banking/downloads/CardsPayments_CheckVisionEnterprise_DS.pdf, Apr. 24, 2013, 2 pages.

"DataStax Enterprise 3.2", Available at: http://docs.datastax.com/en/datastax_enterprise/3.2/datastax_enterprise/sec/secTDE.html—Retrieved on: Jul. 23, 2015, 2 pages.

"Extended European Search Report", EP Application No. 11871440.1, dated Mar. 16, 2015, 5 pages.

"Extended European Search Report", EP Application No. 11871825.3, dated May 11, 2015, 7 pages.

"Final Office Action", U.S. Appl. No. 13/221,629, dated Dec. 23, 2013, 24 pages.

"Foreign Notice of Allowance", CN Application No. 201210314631.1, dated Aug. 20, 2015, 4 pages.

"Foreign Notice of Allowance", CN Application No. 201210314748.X, dated Jul. 3, 2015, 3 pages.

"Foreign Office Action", CN Application No. 201210314631.1, dated Dec. 1, 2014, 14 pages.

"Foreign Office Action", CN Application No. 201210314748.X, dated Mar. 17, 2015, 7 pages.

"Foreign Office Action", CN Application No. 201210314748.X, dated Sep. 23, 2014, 14 Pages.

"International Search Report and Written Opinion", Application No. PCT/US2015/021125, dated Jul. 3, 2015, 9 Pages.

"International Search Report and Written Opinion", Application No. PCT/US2011/055600, dated Jul. 30, 2012, 9 pages.

"International Search Report and Written Opinion", Application No. PCT/US2011/055626, dated Sep. 19, 2012, 9 pages.

"Non-Final Office Action", U.S. Appl. No. 13/221,629, dated May 17, 2013, 27 pages.

"Non-Final Office Action", U.S. Appl. No. 13/221,699, dated Apr. 1, 2013, 16 pages.

"Non-Final Office Action", U.S. Appl. No. 13/898,368, dated Aug. 4, 2015, 17 pages.

"Non-Final Office Action", U.S. Appl. No. 14/221,105, dated Aug. 4, 2015, 25 pages.

"Non-Final Office Action", U.S. Appl. No. 14/506,167, dated Jun. 29, 2015, 16 pages.

(56) References Cited

OTHER PUBLICATIONS

"Notice of Allowance", U.S. Appl. No. 13/221,629, dated Jun. 27, 2014, 16 pages.
"Notice of Allowance", U.S. Appl. No. 13/221,699, dated Oct. 30, 2013, 9 pages.
"Oracle Advanced Security", Available at: http://www.oracle.com/technetwork/database/security/ds-advanced-security-tde-psft-129631.pdf, Apr. 16, 2011, 2 pages.
"Search Report", TW Application No. 100136565, dated Aug. 3, 2015, 1 pages.
"Security Solutions and Services", retrieved from <http://www.csc.com/public_sector/offerings/11043/17449-security_solutions_and_serivces> on Apr. 25, 2011, 2 pages.
"Transparent Data Encryption (TDE)", Available at: https://msdn.microsoft.com/en-in/library/bb934049.aspx—Retrieved on: Jul. 23, 2015, 11 pages.
"Unlock BitLocker under Windows PC", Retrieved from: <http://windows7migration.info/index.phpoption=com_content&view=article&id=1836:unlock-bitlocker-under-windows-pe&catid=42:4sysops&Itemid=61> on Aug. 4, 2011, 5 pages.
Adam,"Enterprise Data Protection: Building Universal Windows Apps That Keep Work and Personal Data Separate and Secure", Available at: https://mix.office.com/watch/fd0jojbqv6qx—Retrieved on: Jul. 23, 2015, 20 pages.
Kalogeropoulos,"Oracle Data Pump Encrypted Dump File Support", In Oracle White Paper, Jul. 2011, 15 pages.
Lane,"Cracking the Confusion: Encryption Layers", Available at: https://securosis.com/blog/cracking-the-confusion-encryption-layers, Feb. 12, 2015, 2 pages.
Lawson,"Meeting Regulatory Compliance Challenges with Data Management Tools Solutions", YL & A, www.ylassoc.com, available at <ftp://public.dhe.ibm.com/software/data/db2imstools/solutions/lawson-reg-compliance.pdf>, Sep. 19, 2006, pp. 1-18.
Li,"Managing Data Retention Policies at Scale", IFIP/IEEE International Symposium on Integrated Network Management 2011, Dublin, Ireland, May 23-27, 2011., available at <http://www.hpl.hp.com/techreports/2010/HPL-2010-203.pdf>, Dec. 21, 2010, 9 pages.
Magnabosco,"Transparent Data Encryption", Available at: https://www.simple-talk.com/sql/database-administration/transparent-data-encryption/, Mar. 16, 2010, 19 pages.
Mont,"A Systemic Approach to Privacy Enforcement and Policy Compliance Checking in Enterprises", Trusted Systems Laboratory, HP Laboratories Bristol, HPL-2006-44, available at <http://www.hpl.hp.com/techreports/2006/HPL-2006-44.pdf>, Mar. 16, 2006, 11 pages.
Toegl,"acTvSM: A Dynamic Virtualization Platform for Enforcement of Application Integrity", Lecture Notes in Computer Science vol. 6802, 2011, Retrieved from <https://online.tugraz.at/tug_online/voe_main2.getvolltext?pCurrPk=60165>, 20 pages.
Wahl,"Oracle Advanced Security Transparent Data Encryption Best Practices", In Oracle White Paper, Jul. 2012, 29 pages.
"International Search Report and Written Opinion", Application No. PCT/US2015/049981, dated Dec. 3, 2015, 11 pages.
"International Preliminary Report on Patentability", Application No. PCT/US2013/061053, dated Nov. 24, 2015, 8 pages.
Menezes,"Handbook of Applied Cryptography", CRC Press LLC,, Jan. 1, 1997, pp. 25-27 & 551-553.
"Adobe AIR 1.5 Applications with Flex—Storing Encrypted Data", Retrieved From: , <http://help.adobe.com/en_US/AIR/1.5/devappsflex/WS5b3ccc516d4fbf351e63e3d118666ade46-7e31.html> May 1, 2015, Oct. 19, 2012, 2 pages.
"Blackberry 10", Retrieved from <http://en.wikipedia.org/wiki/BlackBerry_10#BlackBerry_Balance> on Apr. 2, 2013, Apr. 1, 2013, 8 pages.
"Divide: The Next Generation of Enterprise Mobility", Retrieved at <<http://www.divide.com/download/Divide_Product_Sheet_1116.pdf<< on May 8, 2013, Jan. 20, 2013, 2 pages.

"Exchange ActiveSync", Retrieved from <http://en.wikipedia.org/wiki/Exchange_ActiveSync> on Apr. 1, 2013, Apr. 1, 2013, 5 pages.
"Exchange ActiveSync: Provisioning Protocol", Retrieved from <http://msdn.microsoft.com/en-us/library/dd299443(v=EXCHG.80).aspx> on Apr. 1, 2013, Dec. 3, 2008, 4 Pages.
"Final Office Action", U.S. Appl. No. 13/898,368, dated Apr. 16, 2015, 16 pages.
"How Can We Ensure Data Security on Mobile Devices??", Retrieved From: <http://enterprise.huawei.com/topic/byod_en/solution_byod_info_3.html> Mar. 6, 2014, Jun. 16, 2013, 4 Pages.
"How Do I Prevent 'Sensitive Data Exposure'?", Retrieved From: <https://www.owasp.org/index.php/Top_10_2013-A6-Sensitive_Data_Exposure> May 12, 2015, Jun. 23, 2013, 2 pages.
"InnoSetup Help", Retrieved From: <http://www.jrsoftware.org/ishelp/index.php?topic=filessection> May 12, 2015, 8 pages.
"International Search Report and Written Opinion", Application No. PCT/US2013/061053, dated Jan. 30, 2014, 10 Pages.
"Mobile Device Management", Retrieved from <http://www.bing.com/search?q=mobile+device+management&src=IE-TopResult&FORM=IE10TR> on Apr. 2, 2013, 2013, 2 pages.
"MobileIron Introduces the First Complete Mobile App Persona for the Enterprise", Retrieved from <http://www.mobileiron.com/en/company/press-room/press-releases/371-mobileiron-introduces-the-first-complete-mobile-app-persona-for-the-enterprise> on Mar. 25, 2013, Nov. 6, 2012, 2 pages.
"Non-Final Office Action", U.S. Appl. No. 13/898,368, dated Dec. 8, 2014, 12 pages.
"OMA Device Management", Retrieved from <http://en.wikipedia.org/wiki/OMA_DM> on Apr. 2, 2013, Mar. 25, 2013, 4 Pages.
"OMA Device Management", Retrieved from <http://msdn.microsoft.com/en-us/library/bb737369.aspx>, Aug. 4, 2010, 4 Pages.
"Securing end-user mobile devices in the enterprise", In Proceedings: Thought Leadership White Paper, IBM Global Technology Services, Apr. 2011, 6 Pages.
"ThoriumCloud Enterprise Container", Retrieved from <http://www.thoriumcloud.com/> on Mar. 25, 2013, 2013, 4 Pages.
"Various Mobile Device Management (MDM) Solutions", Retrieved From: <http://www.bing.com/search?q=mobile+device+management&src=IE-TopResult&FORM=IE10TR> Mar. 5, 2014, 2 Pages.
"What Android Sync'd Data is Encrypted?", Retrieved From: <http://android.stackexchange.com/questions/3129/what-android-syncd-data-is-encrypted>, Nov. 25, 2010, 3 pages.
Becher,"Mobile Security Catching Up? Revealing the Nuts and Bolts of the Security of Mobile Devices", Proceedings of IEEE Symposium on Security and Privacy, May 22, 2011, pp. 96-111.
Bugiel,"Practical and Lightweight Domain Isolation on Android", Proceedings of the 1st ACM Workshop on Security and privacy in Smartphones and Mobile Devices, Oct. 17, 2011, 12 pages.
Gudeth,"Delivering Secure Applications on Commercial Mobile Devices: The Case for Bare Metal Hypervisors", Proceedings of the 1st ACM Workshop on Security and privacy in Smartphones and Mobile Devices, Oct. 17, 2011, pp. 33-38.
Mitchell,"What is a Selective Wipe?", Retrieved from <http://www.landesk.com/blog/what-is-a-selective-wipe/> on Mar. 25, 2013, Apr. 30, 2012, 1 page.
Oberheide,"When Mobile is Harder Than Fixed (and Vice Versa): Demystifying Security Challenges in Mobile Environments", Proceedings of Eleventh International Workshop on Mobile Computing Systems and Applications, Feb. 22, 2010, 6 pages.
Pecherle,"Data Wiping System with Fully Automated, Hidden and Remote Destruction Capabilities", In Journal of WSEAS Transactions on Computers, vol. 9, Issue 9, Available at <http://www.wseas.us/e-library/transactions/computers/2010/88-110.pdf>, Sep. 2010, pp. 939-948.
Pisko,"Trusted Computing in Mobile Platforms—Players, Usage Scenarios, and Interests", Proceedings of Privacy and Security, Sep. 2005, pp. 526-530.
Purdy,"Thumb Drive", Retrieved From: <http://lifehacker.com/5583307/top-10-usb-thumb-drive-tricks-2010-edition> May 12, 2015, Oct. 7, 2010, 6 pages.

(56) References Cited

OTHER PUBLICATIONS

Reardon,"Secure Deletion on Log-structured File Systems", In Proceedings: Technical Report, Department of Computer Science, ETH Zurich Available at: <http://arxiv.org/pdf/1106.0917.pdf>, Jun. 5, 2011, 11 pages.
Stehle,"Provisioning, Policies, Remote Wipe, and the Allow/Block/Quarantine list in Exchange ActiveSync", Retrieved from <http://msdn.microsoft.com/en-us/library/exchange/hh509085(v=exchg.140).aspx> on Apr. 1, 2013, 2013, 20 pages.
Stockton,"Divide and your Data: Privacy, Sync, Backup, Restore, Storage and Wipe", Retrieved from <http://support.divide.com/entries/20964987-Divide-and-your-data-privacy-sync-backup-restore-storage-and wipe> on Mar. 25, 2013, Feb. 8, 2012, 2 pages.
Zeis,"The security of BlackBerry Balance", Retrieved From: <http://crackberry.com/security-blackberry-balance> Mar. 6, 2014, Aug. 2, 2013, 13 pages.
"Windows Selective Wipe for Device Data Management", Retrieved from <http://technet.microsoft.com/en-us/library/dn486874.aspx>, Nov. 1, 2013, 4 pages.
Li, et al., "Scalable and Secure Sharing of Personal Health Records in Cloud Computing Using Attribute-Based Encryption", IEEE Transactions on Parallel and Distributed Systems, vol. 24, Issue 1, Jan. 2013, pp. 131-143.
"Final Office Action", U.S. Appl. No. 13/898,368, dated Dec. 2, 2015, 19 pages.
"Foreign Office Action", TW Application No. 100136564, dated Oct. 20, 2015, 11 pages.
"Non-Final Office Action", U.S. Appl. No. 13/933,928, dated Oct. 21, 2015, 11 pages.
"Non-Final Office Action", U.S. Appl. No. 14/489,288, dated Nov. 6, 2015, 25 pages.
"Second Written Opinion", Application No. PCT/US2015/048750, dated Aug. 8, 2016, 9 pages.
"Batch File Encrypt—Encrypt and decrypt whole files or their parts using symmetric algorithms", Retrieved at: https://web.archive.org/web/20131217055640/http://www.binarymark.com/products/batchfileencrypt/default.aspx—on Dec. 15, 2016, Dec. 17, 2013, 21 pages.
"File locking—Wikipedia", Retrieved at: https://en.wikipedia.org/w/index.php?title=File_locking&oldid=679856482—on Dec. 15, 2016, 5 pages.
"International Preliminary Report on Patentability", Application No. PCT/US2015/048750, dated Dec. 6, 2016, 11 pages.
"International Preliminary Report on Patentability", Application No. PCT/US2015/049981, dated Oct. 18, 2016, 6 pages.
"International Preliminary Report on Patentability", Application No. PCT/US2015/058707, dated Oct. 27, 2016, 7 pages.
"International Search Report and Written Opinion", Application No. PCT/US2016/054036, dated Dec. 1, 2016, 12 pages.
"Second Written Opinion", Application No. PCT/US2016/039468, dated Dec. 1, 2016, 5 pages.
"Advisory Action", U.S. Appl. No. 14/506,167, dated Apr. 13, 2016, 3 pages.
"Corrected Notice of Allowance", U.S. Appl. No. 14/506,167, dated Sep. 7, 2016, 2 pages.
"Corrected Notice of Allowance", U.S. Appl. No. 14/506,167, dated Sep. 27, 2016, 2 pages.
"Examiner's Answer to Appeal Brief", U.S. Appl. No. 13/898,368, filed Sep. 8, 2016, 7 pages.
"Final Office Action", U.S. Appl. No. 14/221,105, dated Feb. 22, 2016, 35 pages.
"Final Office Action", U.S. Appl. No. 14/489,288, dated Jun. 15, 2016, 25 pages.
"Foreign Notice of Allowance", TW Application No. 100136564, dated Feb. 25, 2016, 4 pages.
"Foreign Notice of Allowance", TW Application No. 100136565, dated Mar. 25, 2016, 4 pages.
"Foreign Office Action", TW Application No. 105101128, dated Aug. 23, 2016, 5 pages.

"International Preliminary Report on Patentability", Application No. PCT/US2015/021125, dated May 11, 2016, 7 pages.
"International Search Report and Written Opinion", Application No. PCT/US2016/039468, dated Sep. 1, 2016, 10 pages.
"International Search Report and Written Opinion", Application No. PCT/US2015/058707, dated Jan. 20, 2016, 11 Pages.
"International Search Report and Written Opinion", Application No. PCT/US2015/048750, dated Apr. 11, 2016, 22 pages.
"Non-Final Office Action", U.S. Appl. No. 14/481,672, dated Jul. 28, 2016, 12 pages.
"Non-Final Office Action", U.S. Appl. No. 14/788,377, dated Sep. 23, 2016, 14 pages.
"Non-Final Office Action", U.S. Appl. No. 15/266,591, dated Oct. 12, 2016, 10 pages.
"Notice of Allowance", U.S. Appl. No. 13/933,928, dated Apr. 22, 2016, 8 pages.
"Notice of Allowance", U.S. Appl. No. 14/506,167, dated Jun. 22, 2016, 11 pages.
"Restriction Requirement", U.S. Appl. No. 14/481,672, dated Jun. 28, 2016, 6 pages.
"Second Written Opinion", Application No. PCT/US2015/021125, dated Feb. 2, 2016, 6 pages.
"Second Written Opinion", Application No. PCT/US2015/049981, dated Jul. 26, 2016, 5 pages.
Chen,"Hardware-Assisted Application-Level Access Control", ISC '09 Proceedings of the 12th International Conference on Information Security, 090/Jul. 2009, 16 pages.
"Notice of Allowance", U.S. Appl. No. 15/266,591, dated May 11, 2017, 11 pages.
"Non-Final Office Action", U.S. Appl. No. 14/879,938, dated Mar. 24, 2017, 16 pages.
"Final Office Action", U.S. Appl. No. 14/788,377, dated May 8, 2017, 20 pages.
"Corrected Notice of Allowance", U.S. Appl. No. 15/266,591, dated Jul. 5, 2017, 2 pages.
"Corrected Notice of Allowance", U.S. Appl. No. 15/266,591, dated Jul. 19, 2017, 2 pages.
"Final Office Action", U.S. Appl. No. 14/506,167, dated Nov. 23, 2015, 19 pages.
"Foreign Office Action", CN Application No. 201380076761.9, dated May 31, 2017, 17 pages.
"Final Office Action", U.S. Appl. No. 14/221,105, dated Aug. 23, 2017, 41 pages.
"Final Office Action", U.S. Appl. No. 14/879,938, dated Sep. 7, 2017, 16 pages.
"Notice of Allowance", U.S. Appl. No. 14/481,672, dated Jul. 27, 2017, 7 pages.
"Notice of Allowance", U.S. Appl. No. 14/489,288, dated Aug. 25, 2017, 8 pages.
"Notice of Allowance", U.S. Appl. No. 14/788,377, dated Sep. 14, 2017, 15 pages.
"Second Written Opinion", Application No. PCT/US2016/054036, dated Aug. 8, 2017, 6 pages.
"Supplemental Notice of Allowance", U.S. Appl. No. 14/489,288, dated Sep. 8, 2017, 2 pages.
"Final Office Action", U.S. Appl. No. 14/481,672, dated Feb. 9, 2017, 16 pages.
"Foreign Notice of Allowance", TW Application No. 110501128, dated Dec. 29, 2016, 4 pages.
"Non-Final Office Action", U.S. Appl. No. 14/221,105, dated Feb. 24, 2017, 42 pages.
"Non-Final Office Action", U.S. Appl. No. 14/489,288, dated Jan. 19, 2017, 30 pages.
Kher,"Securing Distributed Storage: Challenges, Techniques, and Systems", ACM Workshop on Storage security and survivability, 2005, p. 9-25.
Sharma,"TransCrypt: Design of a Secure and Transparent Encrypting File System", Master's Thesis, Indian Institute of Technology Kanpur, Aug. 2006, 50 pages.
"Foreign Office Action", EP Application No. 11871440.1, dated Nov. 21, 2017, 4 pages.
"International Preliminary Report on Patentability", Application No. PCT/US2016/039468, dated Oct. 9, 2017, 7 pages.

(56) References Cited

OTHER PUBLICATIONS

"International Preliminary Report on Patentability", Application No. PCT/US2016/054036, dated Nov. 6, 2017, 7 pages.
"Notice of Allowance", U.S. Appl. No. 14/788,377, dated Dec. 1, 2017, 13 pages.
"Notice of Allowance", U.S. Appl. No. 14/879,938, dated Nov. 15, 2017, 8 pages.
"PTAB Decision", U.S. Appl. No. 13/898,368, dated Oct. 18, 2017, 6 pages.

* cited by examiner

ROAMING CONTENT WIPE ACTIONS ACROSS DEVICES

BACKGROUND

As computing technology has advanced, many different types of computing devices have become commonplace. Users oftentimes have multiple different computing devices, such as a laptop or desktop computer, a tablet device, a smart phone, and so forth. Networked or cloud services can be used to allow users to share data across these multiple devices, giving the users access to their data from any of their multiple devices. However, sharing data across these multiple devices can be troublesome for some companies that desire the ability to wipe data from devices (e.g., due to a user no longer being employed by the company) because data may have been shared with devices that the company does not manage.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, in a first computing device content protected based on a key is received from a second computing device, the content having been encrypted, and the key being associated with a third computing device that is being managed by a management policy. A determination is made whether the first computing device is being managed by the management policy. In response to determining that the first computing device is being managed by the management policy, the key is associated with the first computing device. In response to determining that the first computing device is being unmanaged by the management policy, the association of the key with the third computing device is maintained.

In accordance with one or more aspects, content is obtained at a first computing device, the first computing device being managed by a management policy. The content is protected so that the content is configured to be retrieved based on a key, the protecting including encrypting the content, and the key is associated with an identifier of the first computing device. The encrypted content and the key are roamed to a second computing device, the second computing device being an unmanaged device that is not managed by the management policy. Subsequently, in response to receiving a management-initiated wipe command, a wipe command indicating to the second computing device to delete the key is communicated to the second computing device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
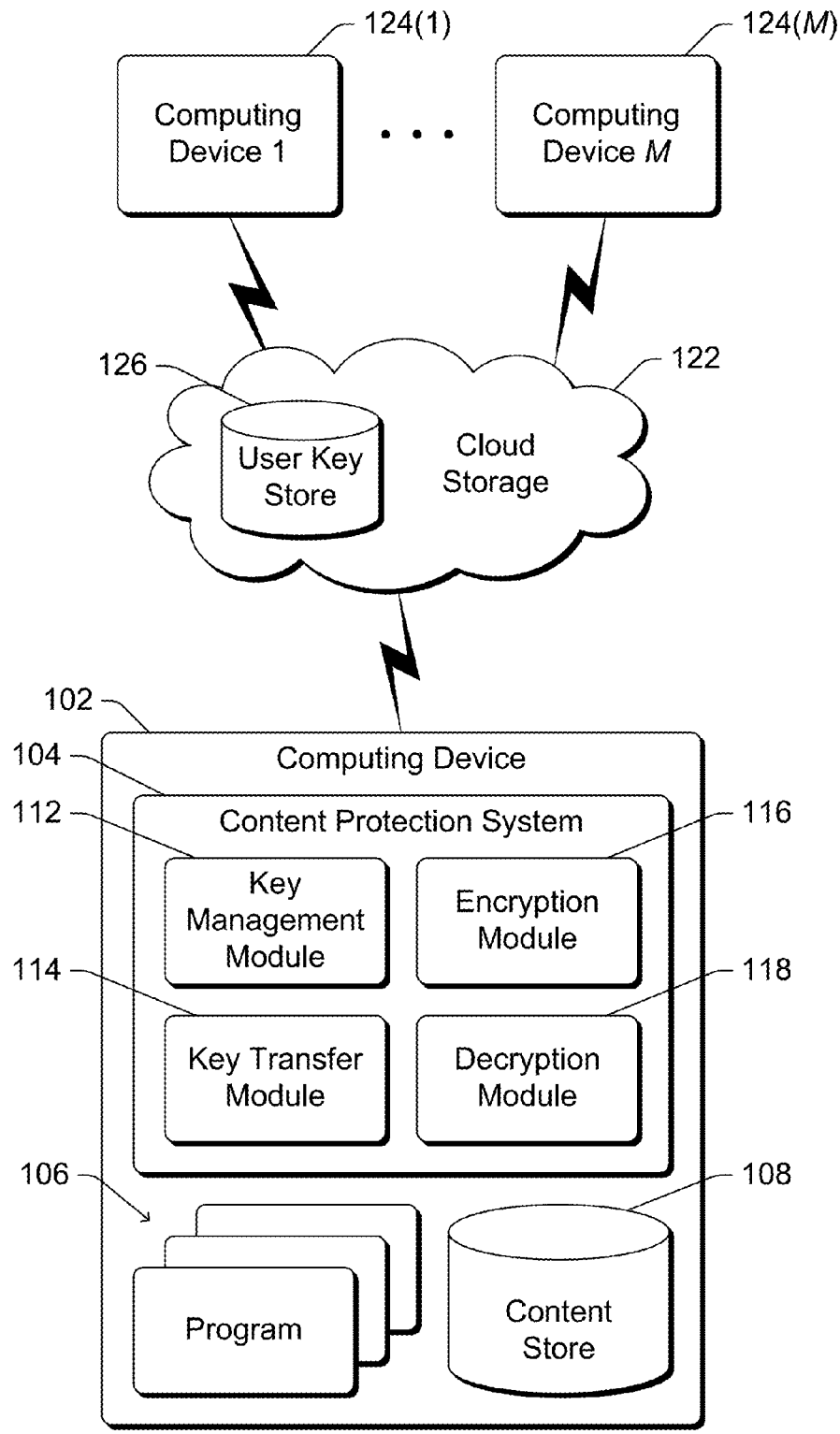
FIG. 1 illustrates an example system implementing the techniques discussed herein in accordance with one or more embodiments.

Roaming content wipe actions across devices is discussed herein. Content on a device is encrypted and protected based on a data protection key. The content can be encrypted using the data protection key, or the data protection key can be used to encrypt one or more other keys that are used to encrypt the content. The protected content can then be copied to cloud storage, and from the cloud storage the protected content can be transferred to various other ones of the user's devices, also referred to as roaming the content or synchronizing the user's devices. Protected content may additionally or alternatively be transferred to various other ones of the user's devices using a peer-to-peer transfer rather than via the cloud storage.

Some computing devices are managed by a policy and thus are also referred to as managed devices. The policy can be a policy associated with various entities, such as a company or organization (e.g., an enterprise policy), an owner or user of the computing devices, a mobile operator managing the devices on behalf of the user, a personal device or home server, and so forth. The key used to retrieve plaintext content from the protected content is associated with an identifier of each of one or more particular devices that provide the key, each of which is the device that generated the key or another managed device to which the protected content was roamed.

A wipe command can be received by a computing device, indicating to make data associated with a particular device unavailable (e.g., indicating to delete a key associated with the particular device). The wipe command is roamed to the various other ones of the user's devices, and in one or more embodiments in response to the wipe command any keys associated with the particular device are deleted from each of the various ones of the user's devices. Alternatively, a key may be deleted from a particular one of the user's devices in response to the last reference to a managed device that synchronizes with the particular one device being removed for that key. Thus, the key can remain on the particular one device as long as there is a management channel that can reach the particular one device.

The techniques discussed herein advantageously improve the usability and security of computing devices by allowing the user's content to roam to various different devices but still be wiped from those devices when desired by an administrator or controller. The data can be wiped from such devices even though one or more of such devices may be unmanaged and thus have no direct channel back to the administrator or controller to receive a wipe command.

References are made herein to encrypting and decrypting content, which can be performed using symmetric key cryptography or public key cryptography. Although such key cryptography is well-known to those skilled in the art, a brief overview of such cryptography is included here to assist the reader. In public key cryptography, an entity (such as a user, hardware or software component, a device, a domain, and so forth) has associated with it a public/private key pair. The public key can be made publicly available, but the entity keeps the private key a secret. Data can be decrypted using the private key, but without the private key it is computationally very difficult to decrypt data that is encrypted using the public key. So, data can be encrypted by any entity with the public key and only decrypted by an entity with the corresponding private key.

In symmetric key cryptography, on the other hand, a shared key (also referred to as a symmetric key) is known by and kept secret by the two entities. Any entity having the shared key is typically able to encrypt data with that shared key, and decrypt data encrypted with that shared key. Without the shared key it is computationally very difficult to decrypt data that is encrypted with the shared key. So, if two entities both know the shared key, each can encrypt data that can be decrypted by the other, but other entities cannot decrypt the data if the other entities do not know the shared key. Similarly, an entity with a shared key can encrypt data that can be decrypted by that same entity, but other entities cannot decrypt the data if the other entities do not know the shared key.

FIG. 1 illustrates an example system 100 implementing the techniques discussed herein in accordance with one or more embodiments. The system 100 includes a computing device 102 that can be a variety of different types of devices. For example, the computing device 102 can be a desktop computer, a server computer, a laptop or netbook computer, a mobile device (e.g., a tablet or phablet device, a cellular or other wireless phone (e.g., a smart phone), a notepad computer, a mobile station), a wearable device (e.g., eyeglasses, watch), an entertainment device (e.g., an entertainment appliance, a set-top box communicatively coupled to a display device, a game console), a television or other display device, an automotive computer, and so forth. Thus, the computing device 102 may range from a full resource device with substantial memory and processor resources (e.g., personal computers, game consoles) to a low-resource device with limited memory and/or processing resources (e.g., traditional set-top boxes, hand-held game consoles).

The computing device 102 includes a content protection system 104, one or more programs 106, and a content store 108. The programs 106 can include various different applications, parts of an operating system, or other programs that can be run on the computing device 102. The content store 108 is one or more storage devices used to store content by the computing device 102. Content refers to any type of data, instructions, or other information stored by the computing device 102. The content store 108 can be implemented using any of a variety of different types of storage devices, such as solid state devices (e.g., Flash memory), magnetic disks, optical discs, and so forth. Although illustrated as being part of the computing device 102, it should be noted that one or more of the storage devices that make up the content store 108 can be implemented on devices separate from, but communicatively coupled to, the computing device 102 (e.g., external hard drives, removable flash drives).

The content protection system 104 manages protection of content on the computing device 102, including managing the encryption and decryption of content, managing keys used to protect the content, and so forth. The content protection system 104 can be implemented as part of an operating system of the computing device 102, or alternatively as another component or module of the computing device 102 separate from the operating system.

The content protection system 104 includes a key management module 112, a key transfer module 114, an encryption module 116, and a decryption module 118. The key management module 112 generates keys that are used to encrypt and decrypt content, including other keys. The key management module 112 also stores keys on the computing device 102 in a secure manner and controls access to the keys, allowing access to the keys only by those components or modules of the computing device 102 that are permitted to access the keys. These keys include a public/private key pair for the computing device 102. In one or more embodiments, the private key of the computing device 102 is protected in hardware of the computing device 102, such as by wrapping the device private key to a Next Generation Credential, sealing the device private key to a trusted platform module (TPM), sealing the device private key to a smart card, sealing the device private key to a hardware security module (HSM), and so forth.

The key transfer module 114 manages securely transferring keys to and from other computing devices. The key transfer module 114 manages protecting keys for transferring to other computing devices, and retrieving keys from protected keys transferred to the computing device 102. The key transfer module 114 can facilitate encryption of a key to be transferred by providing the key to be transferred to the decryption module 118. The key transfer module 114 can similarly facilitate decryption of a key being transferred to the computing device 102 by providing a key (decrypted by the decryption module 118) to the key management module 112.

The encryption module 116 encrypts content based on one or more keys. This encryption can be performed using any of a variety of different public and/or proprietary encryption techniques or algorithms, and can use symmetric key cryptography or public key cryptography. The decryption module 118 decrypts content based on one or more keys. This decryption can be performed using any of a variety of different public and/or proprietary decryption techniques or algorithms, and can use symmetric key cryptography or public key cryptography.

A user of the computing device 102 also has a particular identity when using the device, such as a user name or user account identifier of the user. This user name or user account identifier is, for example, the name or identifier that the user logs into the computing device 102 with, the name or identifier that the user logs into a service (e.g., of a cloud storage service, also referred to as a cloud service) with, and so forth. The computing device 102 accesses a cloud storage 122, which is a set of components or technologies that allow the short or long term storage of content in one or more locations. The storage of content can be implemented using any of a variety of different storage mechanisms that can be accessed via any of a variety of different data networks (e.g., the Internet, a local area network (LAN), a phone network, an intranet, other public and/or proprietary networks, or combinations thereof) wired connections (e.g., universal serial bus (USB) connections), wireless connections (e.g., wireless USB connections), and so forth. The cloud storage 122 can be a trusted cloud storage that is relied on to keep content secure from other users or devices, or an untrusted cloud storage that is not relied on to keep content secure from other users or devices. The cloud storage 122 is typically one or more storage devices situated remotely from the computing device 102, but can alternatively be other storage devices (e.g., a removable device (e.g., a flash or magnetic drive coupled to the computing device 102 using a wired or wireless connection)).

The cloud storage 122 can be accessed via any of a variety of different communication channels. The communication channel can be a trusted channel or an untrusted channel. A trusted channel refers to a communication channel that is relied on to keep content secure from other users or devices, and an untrusted channel refers to a communication channel that is not relied on to keep content secure from other users or devices.

The cloud storage 122 can optionally be implemented as one of multiple different services (also referred to as cloud services). These cloud services can include, for example, content storage services, content editing services, communication (e.g., email or messaging) services, and so forth. These services can be implemented by one or more of a variety of different types of devices, such as any one or more of those discussed above with reference to computing device 102.

The cloud storage 122 allows content to be shared or roamed among the computing device 102 and other computing devices 124(1), . . . , 124(M). Protected content refers to content that has been encrypted, and protected content can be transferred to the cloud storage 122 by one of computing devices 102 or 124, as well as received by others of the computing devices 102 or 124. These computing devices are other computing devices of the user, or other computing devices that the user has logged into. Although the protected content can be transferred to these devices, the protected content cannot be accessed on these devices without the proper keys, as discussed in more detail below. Additionally, it should be noted that the cloud storage 122 need not be trusted by the user of the computing device 102—protected content is stored on the cloud storage 122, and the cloud is not provided with the key to unprotect (decrypt) the content, so the cloud cannot access the plaintext (unencrypted) content.

The cloud storage 122 also maintains a user key store 126, which corresponds to the identity of the user. A user can optionally have different identities at different times (e.g., different times logging into the computing device 102). In one or more embodiments, the identity of the user at any given time is the identity of the user when he or she is logged into the computing device 102 (and/or logged into the cloud storage 122) at that given time. The user key store 126 includes a public key of one or more public/private key pairs, such as a public key of a computing device 102, a public key of one of computing devices 124(1), . . . , 124(M), and a data protection public key. These keys are used to protect the content while at the same time allowing the user to access the content from multiple devices as discussed in more detail below.

In the discussions herein, reference is made to content and keys being roamed via the cloud storage 122. It should be noted that the techniques discussed herein can apply to other communication mechanisms without relying on a cloud storage or a cloud service, such as peer to peer communication.

Figure 2:
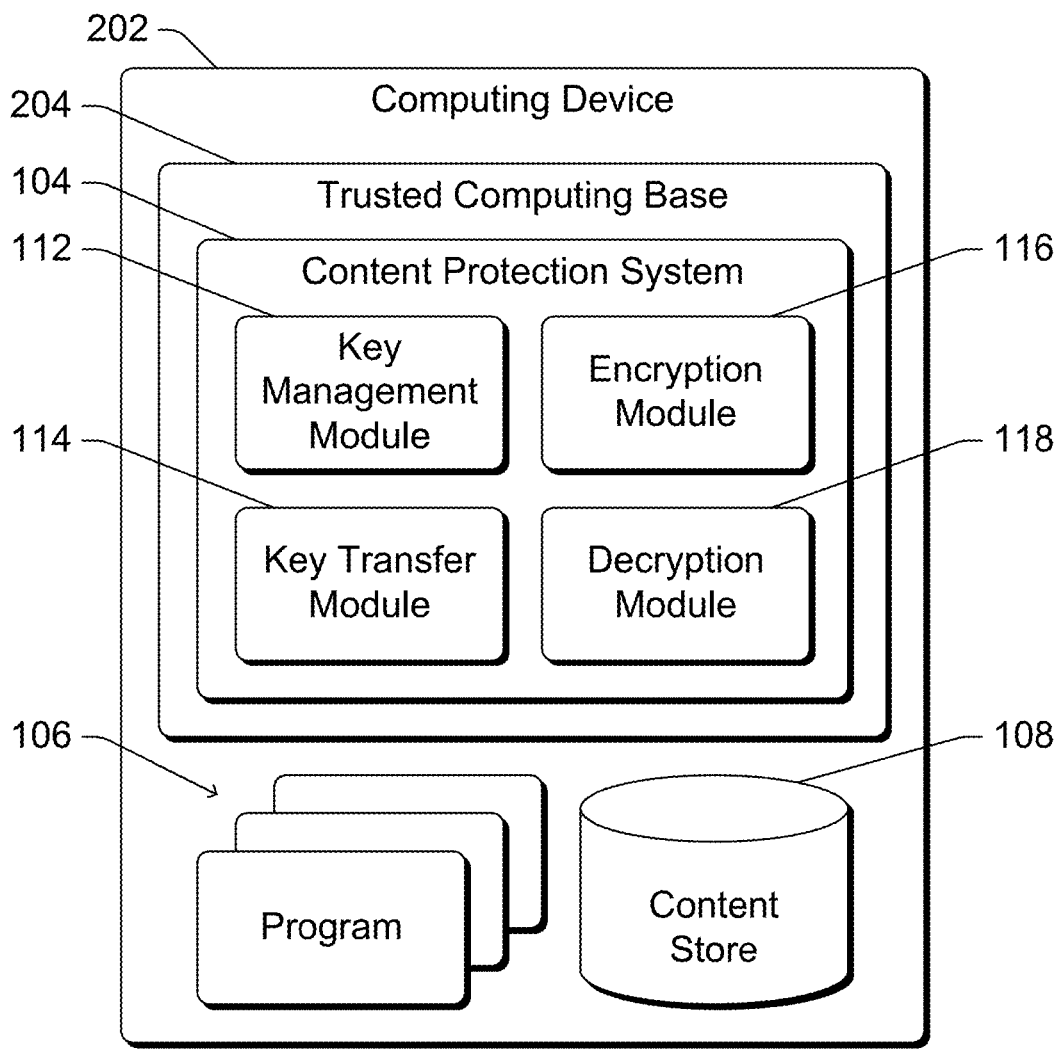
FIG. 2 illustrates another example computing device implementing the techniques discussed herein in accordance with one or more embodiments.

FIG. 2 illustrates another example computing device 202 implementing the techniques discussed herein in accordance with one or more embodiments. The computing device 202 includes a content protection system 104, one or more programs, and a content store 108 analogous to the computing device 102 of FIG. 1. However, the computing device 202 differs from the computing device 102 in that the content protection system 104 is implemented as part of a trusted computing base 204.

The trusted computing base 204 operates as a secure or trusted component of the computing device 202, generating and protecting keys. Components of the trusted computing base 204 can encrypt or decrypt content in response to requests to do so from a program 106 (including requests from the operating system), but the trusted computing base 204 does not reveal the encryption or decryption keys to any other program of module of the computing device 202 that is not included as part of the trusted computing base 204. Thus, if a program 106 were to be malware, or a portion of the operating system of computing device 202 were to be untrusted or compromised by malware, the keys remain protected by the trusted computing base 204 and are not revealed to such a program or operating system. The trusted computing base 204 can, however, transfer keys that have been encrypted to other computing devices, as discussed in more detail below.

Returning to FIG. 1, content on the computing device 102 is protected by the content protection system 104 based on a data protection public/private key pair. The key management module 112 generates the data protection public/private key pair, and keeps the data protection private key secret. The data protection public key is communicated to the cloud storage 122 and stored as part of the user key store 126. The data protection public/private key pair corresponds to or is tied to the identity of the user. If the user has multiple different identities, then multiple different data protection public/private key pairs can be generated (each corresponding to or tied to a different one of the multiple identities), or alternatively a single data protection public/private key pair can be shared across the multiple different identities. At any particular time, the key management module 112 allows the data protection private key corresponding to the user identity at that particular time to be used to protect content, but does not allow data protection private keys corresponding to other user identities to be used to protect content. The data protection private key is thus also referred to as being protected by the particular identity.

The protected content is also stored on the cloud storage 122. This storage of protected content on the cloud storage 122 can be managed by one of the programs 106, such as a content synchronization program. As new content is generated on or otherwise added to the content store 108, the new content is protected by the content protection system 104 and stored on the cloud storage 122 by the content synchronization program. Similarly, as new content is generated on or otherwise added to the content stores of other computing devices 124 (e.g., while the user is logged into such other devices using the same identity) and stored on the cloud storage 122 by the other computing devices 124, the new content is obtained from the cloud storage 122 by the content synchronization program and stored in the content store 108.

The protected content is protected based on the data protection public/private key pair. The content protection system of a computing device 102 or 124 uses the data protection private key to obtain the plaintext content from the protected content. Thus, in order for multiple different ones of the computing devices 102 and 124 to obtain the plaintext content from protected content, the data protection private key is shared among the different computing devices 102 and 124. This sharing is done in a manner that protects the data protection private key, allowing the computing devices 102 and 124 to obtain the data protection private key but preventing other users or devices from obtaining the data protection private key. Thus, the sharing of the data protection private key can be done via unsecure cloud storage and/or unsecure communication channels.

Figure 3:
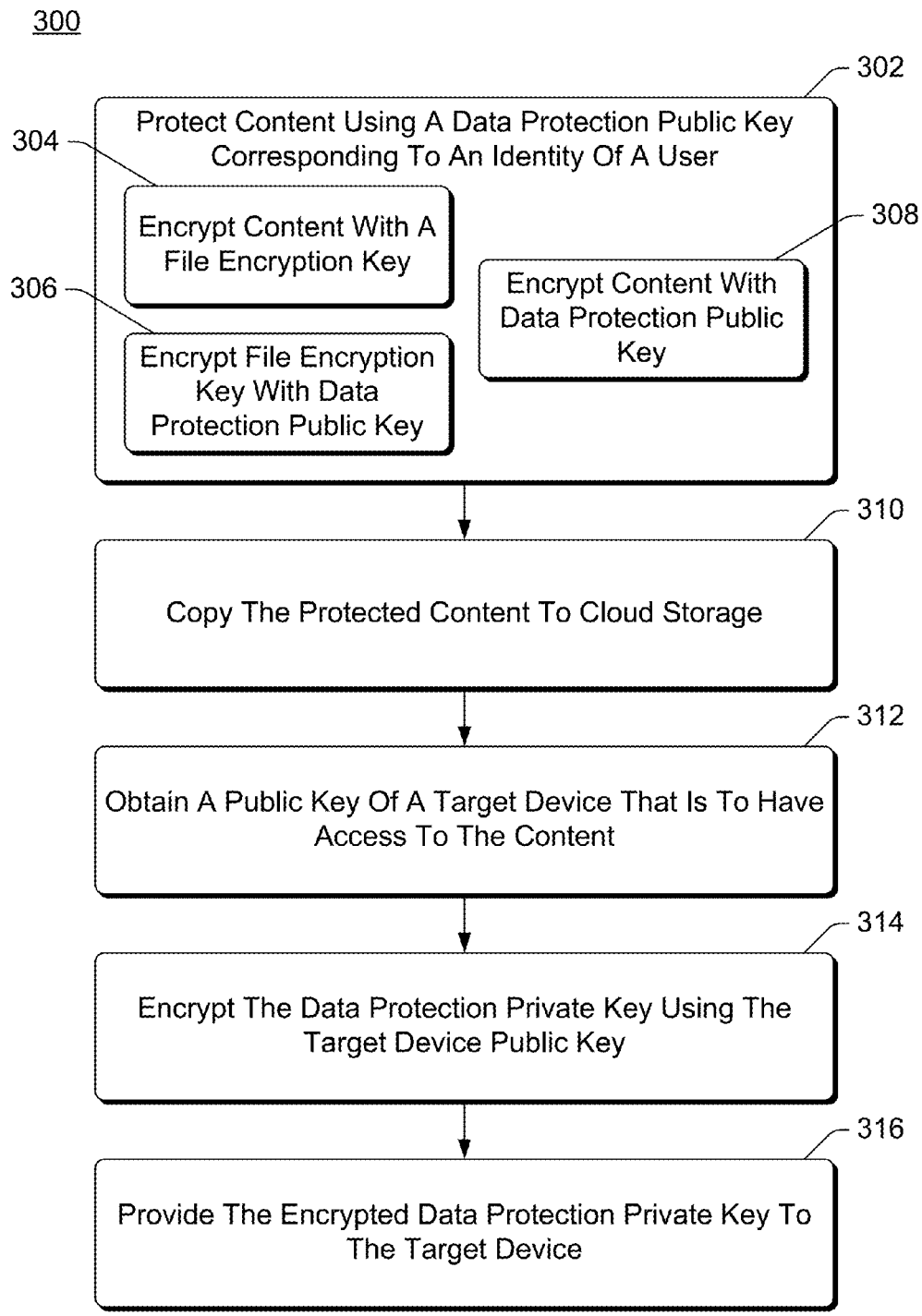
FIG. 3 is a flowchart illustrating an example process for implementing secure key management for roaming protected content in accordance with one or more embodiments.

FIG. 3 is a flowchart illustrating an example process 300 for implementing secure key management for roaming protected content in accordance with one or more embodiments. Process 300 is carried out by a content protection system of a computing device, such as content protection system 104 of FIG. 1 or FIG. 2, and can be implemented in software, firmware, hardware, or combinations thereof. Process 300 is shown as a set of acts and is not limited to the order shown for performing the operations of the various acts. Process 300 is an example process for implementing secure key management for roaming protected content; additional discussions of implementing secure key management for roaming protected content are included herein with reference to different figures.

In process 300, content is protected using a data protection public key corresponding to an identity of the user (act 302). The content can be protected using the data protection public key in various different manners. In one or more embodiments, the content is encrypted using a file encryption key (act 304). The file encryption key is used to encrypt the content by using the file encryption key as the key of an encryption process (e.g., a symmetric encryption process). The file encryption key is also encrypted with the data protection public key (act 306). The data protection public key is used to encrypt the file encryption key by using the data protection public key as the key of a public key cryptography process. Thus, multiple different keys can be used to protect the content—the file encryption key (e.g., a symmetric key) that is used to encrypt the content, and the data protection public/private key pair of which the data protection public key is used to encrypt the file encryption key.

Alternatively, rather than using a file encryption key, the content is encrypted with the data protection public key (act 308). The data protection public key is used to encrypt the content by using the data protection public key as the key of a public key cryptography process. Thus, the data protection public/private key pair of which the data protection public key is used to encrypt the content can be used to protect the data without any use of a symmetric key.

Regardless of the manner in which the content is protected, the protected content is copied to cloud storage (act 310). Because the content is protected, the cloud storage itself does not have access to the plaintext (unencrypted) content. The protected content is thus stored on the computing device implementing the process 300, and due to copying the protected content to the cloud storage the protected content is stored by the cloud storage and roamed to others of the user's devices.

A public key of a target device that is to have access to the content is obtained (act 312). The public key of the target device can be obtained in a variety of different manners. In one or more embodiments, each computing device that the user logs into has its own public/private key pair. This device public/private key pair is generated by the computing device (e.g., the key management module of the computing device), and the device private key is kept secret by the computing device (e.g., protected in hardware of the computing device as discussed above). However, in one or more embodiments each computing device, however, stores its device public key in the user key store of the cloud (e.g., the user key store 126 of FIG. 1). Thus, each of the computing devices of a user (e.g., those that the user logs into using the same identity) provides its device public key to the cloud, which makes those device public keys available to the other computing devices of the user. Alternatively, a computing device can make its device public key available to the other computing devices of the user in different manners, such as a direct exchange independent of the user key store 126 and/or the cloud (e.g., transferring the device public key to and reading the device public key from a removable flash memory device or phone, transferring the device public key using another wired or wireless communication channel, and so forth).

The data protection private key is encrypted using the target device public key (act 314). By encrypting the data protection private key using the target device public key, the target device is able to retrieve the data protection private key using the target device private key, but other devices (without the target device private key), are not able to retrieve the data protection private key.

The encrypted data protection private key is provided to the target device (act 316). The encrypted data protection private key can be provided to the target device using any of a variety of different mechanisms, such as the cloud storage 122 of FIG. 1, a removable flash memory device or phone, another wired or wireless communication channel, and so forth. It should be noted that, because the data protection private key is encrypted and the target device is the only device with the target device private key, the encrypted data protection private key can be transferred or otherwise communicated to the target device via any of a variety of trusted or untrusted channels.

Once the target device has the encrypted data protection private key, the target device can readily retrieve the data protection private key using the target device private key. The content protection system of the target device keeps the data protection private key secure, and can use the data protection private key to retrieve the plaintext content from the protected content (e.g., by decrypting the file encryption key using the data protection private key and then decrypting the encrypted content using the file encryption key, or by decrypting the encrypted content using the data protection private key).

The target device to which the data protection private key is to be provided can be identified in different manners. In one or more embodiments, the target device communicates a notification to the device implementing process 300 that the target device desires the data protection private key. This notification can be via the cloud storage, or alternatively another communication channel. Alternatively, the target device to which the data protection private key is to be provided can be determined in different manners. For example, the device implementing process 300 (or the user key store 126) can maintain a record of which other devices the data protection policy private key has been provided to, and can automatically store on the cloud storage the data protection private key encrypted using each device public key in the user key store 126 for which the device implementing process 300 has not yet stored an encrypted data protection private key on the cloud storage.

Figure 4:
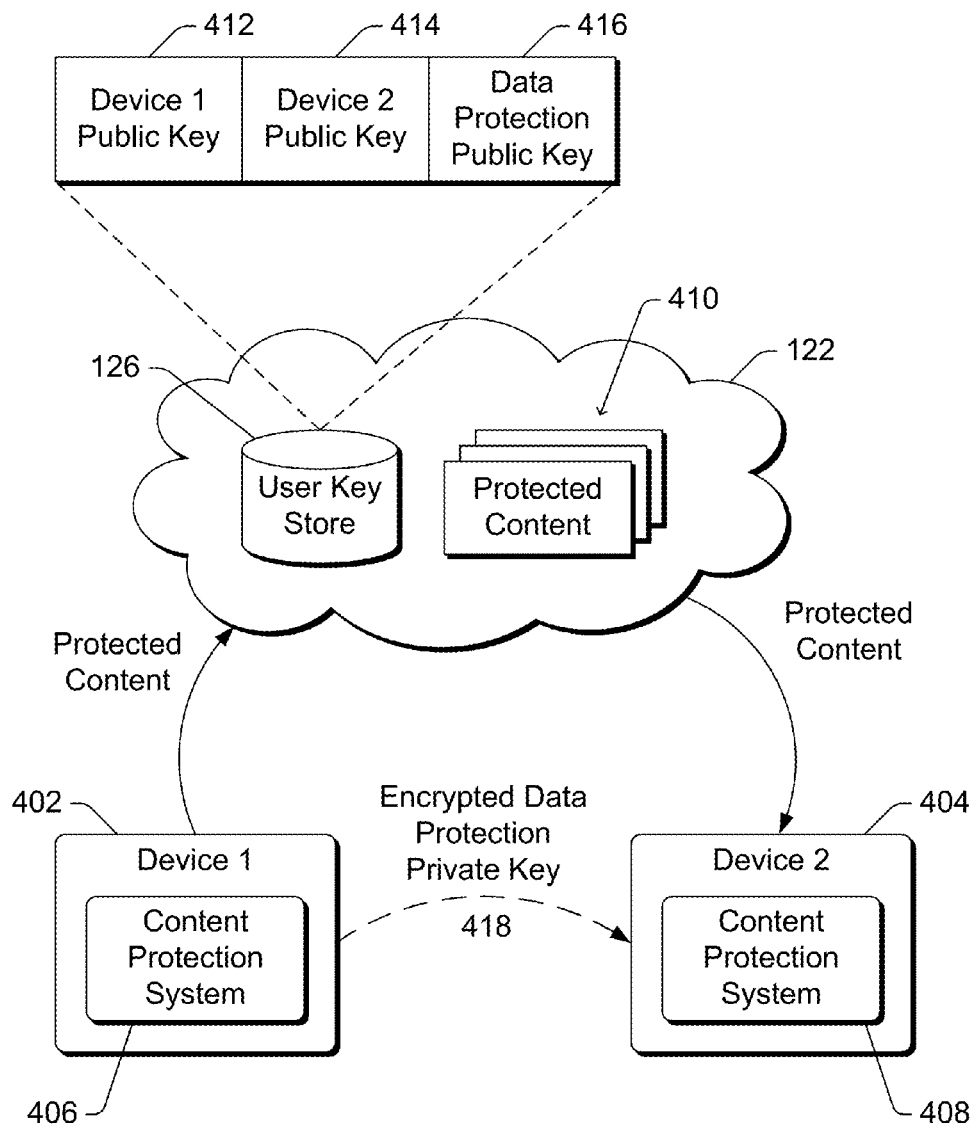
FIG. 4 illustrates an example system in which content is roamed and a data protection private key is shared in accordance with one or more embodiments.

FIG. 4 illustrates an example system 400 in which content is roamed and a data protection private key is shared in accordance with one or more embodiments. A user logs into two different ones of his computing devices 402 and 404 at the same or different times. The user can be, but need not be, logged into both of the computing devices 402 and 404 concurrently in order to roam content and/or share the data protection private key. Each computing device 402 and 404 can be a computing device 102 of FIG. 1 or a computing device 202 of FIG. 2. Each computing device 402 and 404 has a content protection system 406 and 408, respectively, as discussed above. Protected content 410 is provided to the cloud storage 122 by the computing device 402, and copied to the computing device 404 from the cloud storage 122.

The computing device 402 provides a device public key of the computing device 402 to the key store 126, which maintains the key, shown as device 1 public key 412. The computing device 404 provides a device public key of the computing device 404 to the key store 126, which maintains the key, shown as device 2 public key 414. The computing device 402 (or alternatively the computing device 404) also provides the data protection public key to the key store 126, which maintains the key, shown as data protection public key 416. The data protection public key 416 can be used to share data among different devices or different user identities, as discussed in more detail below.

The computing device 402 obtains the device 2 public key 414 from the user key store 126, and encrypts the data protection private key using the device 2 public key 414. The encrypted data protection private key is provided 418 to the computing device 404, allowing the computing device 404 to decrypt the protected content 410.

In one or more embodiments, the data protection public/private key pair is generated by one device, such as the first device that the user logs into using the user identity. The data protection private key is then provided to the other devices of the user as he logs into those other devices using the user identity. Thus, the protected content is protected using the same data protection public/private key pair rather than each device protecting the data using its own data protection public/private key pair.

In one or more embodiments, an additional user verification is performed prior to encrypting and providing the data protection private key to the target device. The computing device from which the data protection private key is being transferred (e.g., the computing device 402 in the example of FIG. 4), also referred to as the source device, prompts the user of the source device to consent to the transfer of the data protection private key. This prompt can be a visual display or other presentation to the user of the source device. This prompt can include a user-generated nonce or other value (e.g., received from the user at the target device and provided to the source device) so that the cloud storage or any other malicious device or component cannot impersonate the target device or user. A user input is received indicating whether the transfer is consented to. The encryption and providing of the data protection private key continues if the transfer is consented to, but does not continue and the data protection private key is not provided to the target device if the transfer is not consented to.

By encrypting and providing the data protection private key to the target device only in response to user consent to transfer the key, additional security protection is advantageously provided against a man-in-the-middle attack. A malicious device or program may attempt a man-in-the-middle attack by pretending to be the target device. The user of both the source device and the target device is typically the user desiring to have the key transferred to the target device, so the user will readily know whether he or she is requesting the transfer. If a prompt to consent to a transfer is provided to the user when he is not having another device of his being set up for data to be roamed to, the user can assume that such a prompt is due to the actions of a malicious device or program, and decline to give consent to the key transfer.

As an added security precaution, an offline verification of the target device can be performed as part of the consent provided by the user. For example, if the data protection private key is to be provided from the device 402 (the source device in this example) to the device 404 (the target device in this example), an identification of the device 404 (e.g., a hash value generated from public key of the device 404) can be displayed or otherwise presented by both the device 402 and the device 404. If the two identifications are the same, then the user can consent to transferring the data protection private key to the device 404. However, if the two identifications are not the same, then consent can be withheld, preventing the data protection private key from being provided to the device 404. If the two identifications are not the same, then the user can assume that a problem has occurred, such as another device or program is posing as the device 404 (e.g., using a man-in-the-middle attack), and so forth.

Thus, the sharing of a data protection private key can be performed in different manners. In one or more embodiments, the sharing is performed from a convenience-based approach. The user can just add a new device to which content is to be roamed (e.g., by logging into the device with his user identity), and a notification is sent to the device 402. The notification can be sent from the cloud (e.g., a notification from the user key store 126 that a new device public key has been added to the user key store 126) or from the new device. In response to the notification, the device 402 cloud provides the encrypted data protection private key to the new device.

Alternatively, the sharing of a data protection private key is performed from a security-based approach. A new device to which content is to be roamed sends a value (e.g., an identifier of the new device or a nonce) to the device 402, which displays or otherwise presents (e.g., plays back audibly) the value at the device 402. User input to the device 402 confirms the value (so that the cloud storage cannot impersonate the user) and that the user agrees to release the data protection private key (encrypted with the public key of the new device) to the new device.

Returning to FIG. 1, the techniques discussed herein allow the encrypted content to be transferred to (roamed to) various other ones of the user's devices. Each of the user's devices can retrieve the plaintext content after obtaining the data protection private key, as discussed above. Furthermore, the techniques discussed herein allow a user to share protected content with other users or other user identities of the same user.

In one or more embodiments, one or more keys of the user key store 126 can be configured to be readable by additional user identities, such as all other user identities, specific user identities (e.g., as specified by the user of the computing device 102), and so forth. These different user identities can be user identities corresponding to different users or the same user. Thus, the data protection public key in the user key store 126 can be made available to other user identities. If a user logged into a computing device 124 desires to communicate content to a user with a particular user identity, the computing device 124 can obtain the data protection public key of the particular user identity from the user key store 126, protect the content using the obtained data protection public key, and store the protected content on the cloud storage. The content can be protected by encrypting the content with the data protection public key of the particular user identity, or by encrypting a file encryption key (that was or is used to encrypt the content) with the data protection public key of the particular user identity. The plaintext content can thus be retrieved from the protected content only by a device with the data protection private key, and the protected content can be communicated to the computing device 102 via the cloud storage 122 or other untrusted cloud storage or communication channel.

As an added security precaution, an offline verification of the data protection public key obtained from the user key store 126 can be performed prior to protecting the content with the obtained data protection public key. For example, if a user A logged into the computing device 124(1) with user identity A desires to share protected content with a user B logged into the computing device 102 with user identity B, the computing device 124(1) obtains the data protection public key of user identity B from the user key store 126. An identification of this obtained data protection public key (e.g., a hash value generated from the obtained data protection public key) can be displayed or otherwise presented to the user A of the computing device 124(1). Furthermore, an identification of the data protection public key (e.g., a hash value generated from the data protection public key) of user identity B can be displayed or otherwise presented to the user B of the computing device 102. These two displayed (or otherwise presented) identifications of the data protection public key can be compared (e.g., by either or both users) to verify the identifications are the same. If the two identifications are the same, then user A (and/or user B) can authorize the computing device 124(1) to proceed with protecting the content with the data protection public key of user identity B. However, if the two identifications are not the same, then user A (and/or user B) can provide an input indicating to the computing device 124(1) to cancel the sharing of the content, and to not protect the content with the data protection public key of user identity B. If the two identifications are not the same, then user A (and/or user B) can assume that a problem has occurred, that another device is posing as the computing device 102 (e.g., using a man-in-the-middle attack), and so forth.

It should be noted that the data protection private key is maintained by the content protection system 104 and is not revealed to the cloud storage 122. There is no centralized key management facility for the various devices where the data protection private key is stored (e.g., no key escrow service or similar service is provided by the cloud storage 122). In one or more embodiments, one or more measures are taken to provide a backup of the data protection private key, allowing seamless recovery of the data protection private key in the event the data protection private key is no longer available from the computing device 102 (e.g., due to the computing device 102 malfunctioning, the computing device 102 being lost or stolen, etc.).

Various different measures can be taken to protect the data protection private key for recovery, such as protecting the data protection private key using biometrics, protecting the data protection private key using a phone, protecting the data protection private key using a secret-question-secret-answer technique, combinations thereof, and so forth. The measures can be taken by the content protection system 104 of FIG. 1 (e.g., the key management module 112).

Protecting the data protection private key using biometrics refers to collecting biometric data regarding the user and deriving a key from the biometric data. The biometric data can take various different forms, such as a fingerprint data, eye scan (e.g., retina scan) data, face scan (e.g., face recognition) data, voice data, and so forth. This biometric data can be converted into a key using any of a variety of public and/or proprietary techniques, such as deriving a key based on the entropy from the biometric data. The key derived from the biometric data is used to encrypt the data protection private key (e.g., using any of a variety of symmetric key cryptography techniques). The encrypted data protection private key can then be stored at a location external to the computing device 102, including the cloud storage 122.

If the data protection private key were to be lost from the computing device 102 (or the computing device 102 were no longer available or usable), the data protection private key can be retrieved by the user. Biometric data is again obtained from the user, and if the biometric data is the same as was used when encrypting the data protection private key, a key derived from the newly obtained biometric data can be used to decrypt the data protection private key.

Protecting the data protection private key using a phone refers to storing the data protection private key on a phone (e.g., a smart phone) of the user's. Although discussed herein as a phone, the data protection private key can alternatively be stored on various other devices that are trusted by the user. The data protection private key can be transferred to the phone in a variety of different manners, including manual entry of the key by the user (e.g., the data protection private key is displayed by the computing device 102, and the user manually enters the key into his or her phone). The data protection private key can alternatively be transferred to the phone in other manners, such as based on automatic identification of a display of the key or a representation of the key by the computing device 102. For example, the data protection private key can be displayed by the computing device 102 and the display captured by a camera of the phone. Optical character recognition can optionally be performed on the captured image to determine the key. By way of another example, a quick response (QR) code that encodes the data protection private key can be displayed by the computing device 102 and captured by a camera of the phone. The data protection private key can alternatively be transferred to the phone in various other wired or wireless manners, such as using a USB connection, a wireless USB connection, infrared communication, NFC (near-field communication), and so forth.

If the data protection private key were to be lost from the computing device 102 (or the computing device 102 were no longer available or usable), the data protection private key can be retrieved from the phone. The key can be provided from the phone to the computing device 102 (or a new computing device) using any of a variety of techniques analogous to those discussed in storing the data protection private key on the phone.

Protecting the data protection private key using a secret-question-secret-answer technique refers to collecting one or more answers to one or more questions. The questions can take various forms, such as questions regarding knowledge of the user's past, questions regarding secret information (e.g., a personal identification number (PIN) or password created by the user), and so forth. The answers are designed to be secret answers that only the user is expected to know. The one or more answers can be converted into a key using any of a variety of public and/or proprietary techniques, such as a one-way hash. The key derived from the one or more answers is used to encrypt the data protection private key (e.g., using any of a variety of symmetric key cryptography techniques). The encrypted data protection private key can then be stored at a location external to the computing device 102, including the cloud storage 122.

If the data protection private key were to be lost from the computing device 102 (or the computing device 102 were no longer available or usable), the data protection private key can be retrieved by the user. The one or more answers are again obtained from the user, and if the one or more answers are the same as the one or more answers used when encrypting the data protection private key, a key derived from the one or more answers can be used to decrypt the data protection private key.

A single one of these different measures (e.g., biometric protection, phone protection, secret-question-secret-answer protection) can be used to protect the data protection private key, or a combination of these different measures can be used to protect the data protection private key. For example, both biometric protection and secret-question-secret-answer protection can be used, so the data protection private key can be retrieved by the user only if biometric data obtained from the user is the same as was used when encrypting the data protection private key, and if one or more answers obtained from the user to one or more questions are the same as the one or more answers used when encrypting the data protection private key.

In the discussions herein, reference is made to a single data protection public/private key pair that is used by all of the computing devices. Alternatively, multiple data protection public/private key pairs can be used, such as a separate data protection public/private key pair for each computing device, multiple data protection public/private key pairs for each of one or more computing devices, and so forth. The data protection private keys for each of these multiple data protection public/private key pairs is provided to the other computing devices using the techniques discussed herein.

It should also be noted that although reference is made to one cloud storage (e.g., cloud storage 122 of FIG. 1), alternatively multiple different cloud storages or cloud services can be used, whether concurrently, sequentially, or even temporarily. For example, different services could be for redundancy of the user key store 126, to have targeted per-service user key stores such as to share securely with more and/or different users, to store the user key store 126 temporarily on a different cloud storage or cloud service for the purpose of sharing with a user on a different cloud storage or cloud service, and so forth.

In one or more embodiments, the techniques discussed herein are used in various environments (e.g., companies or other organizations, home use) in which one or more computing devices are managed by a policy referred to as a management policy. Computing devices managed by such a policy are also referred to as managed devices, and devices not managed by such a policy are also referred to as unmanaged devices. The management policy identifies various different settings, configurations, actions, and so forth to be taken by the managed device, typically involving protecting content or access to various resources. A managed device can be managed by a single entity, or alternatively multiple entities. For example, in a consultant scenario an employer can hire out a user to another company, and both the employer and the other company can apply management policies to the managed device. By way of another example, a user may bring his or her own device to use at work, and both the user and the employer can apply management policies to the managed device.

One such action that may be taken is the wiping of content on a computing device, which refers to making the content unavailable on the computing device. Content can be made unavailable on a computing device in different manners, such as by deleting the content, by deleting a key used to decrypt the content, and so forth. A wipe command indicating to wipe the content on a computing device may be received by the computing device for various reasons, such as the user of the computing device is no longer employed by the company or organization, the computing device has been lost or stolen, and so forth. A wipe command is typically initiated by a management source, which refers to an entity that is responsible for specifying or implementing the management policy. The management source can be various different entities, such as a system administrator, a controller or management device, a user of the device, the owner of the device, a mobile operator, and so forth.

Using the techniques discussed herein, content can be roamed among multiple different computing devices, some of which can be managed devices and some of which can be unmanaged devices. Managed devices are referred to as having a direct channel back to the management source (e.g., an administrator or controller), allowing the managed devices to receive the wipe command directly from the management source. Unmanaged devices, however, are referred to as lacking (not having) a direct channel back to the management source, so unmanaged devices are not able to receive the wipe command directly from the management source.

A wipe command is initiated by a management source as discussed above and is received by a managed device rather than an unmanaged device. However, a wipe command can advantageously be roamed to the multiple different computing devices, analogous to the roaming of protected content. A wipe command can thus advantageously be roamed to an unmanaged device, and content can be made unavailable on the unmanaged device in response to the wipe command despite the unmanaged device not being managed by the management policy. For example, a user can provide an input to wipe a personal smart phone and a device that synchronizes data with the smart phone but which is not managed by the mobile operator (e.g., a smart watch that is not connected to or associated with the mobile operator that manages the smart phone) can also be wiped using the techniques discussed herein.

Figure 5:
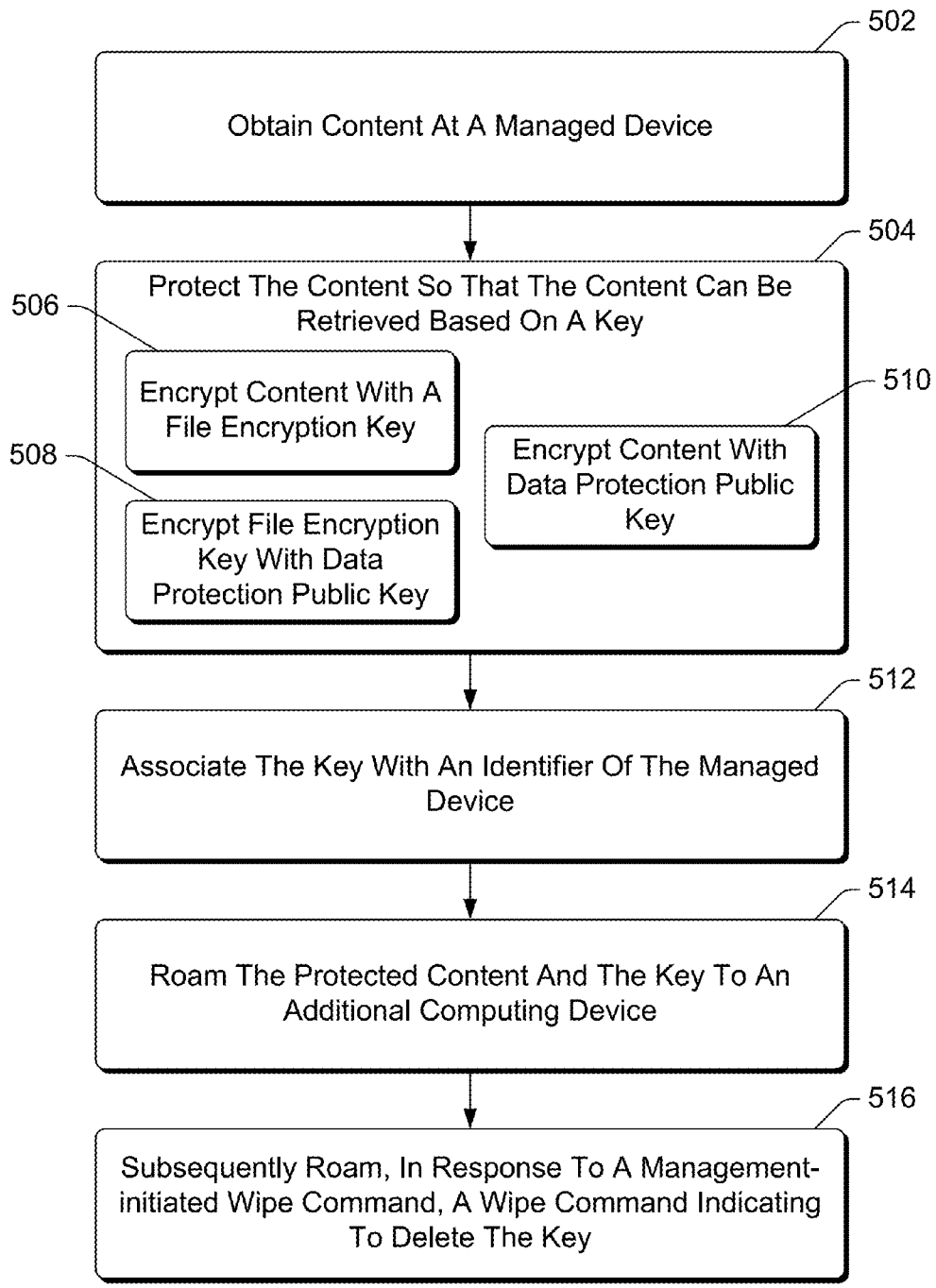
FIG. 5 is a flowchart illustrating an example process for roaming content wipe actions across devices in accordance with one or more embodiments.

FIG. 5 is a flowchart illustrating an example process 500 for roaming content wipe actions across devices in accordance with one or more embodiments. Process 500 is carried out by a computing device, such as the computing device 102 of FIG. 1 or the computing device 202 of FIG. 2, and can be implemented in software, firmware, hardware, or combinations thereof. Process 500 is shown as a set of acts and is not limited to the order shown for performing the operations of the various acts. Process 500 is an example process for roaming content wipe actions across devices; additional discussions of roaming content wipe actions across devices are included herein with reference to different figures.

In process 500, content is obtained at a managed device (act 502). The content can be obtained in any of a variety of different manners, such as by being created on the managed device, being received as an electronic mail attachment, being copied from another device, and so forth.

The content is protected so that the content can be retrieved based on a key (act 504). The content can be protected so that the content can be retrieved based on the key in various different manners. In one or more embodiments, as discussed above, the content is encrypted using a file encryption key (act 506), and the file encryption key is encrypted with the data protection public key (act 508). In such situations, the content can be retrieved based on the file encryption key as well as the data protection private key. Alternatively, rather than using a file encryption key, the content is encrypted with the data protection public key (act 510) as discussed above. In such situations, the content can be retrieved based on the data protection private key.

Regardless of the manner in which the content is protected, a key based on which the protected content can be retrieved is associated with an identifier of the managed device (act 512). This key associated with the identifier of the managed device can be the file encryption key or the data protection private key. In general, the key is associated with an identifier denoting a device providing the key. The device providing the key can be the device that generated the key, or another managed device as discussed in more detail below. This association can be maintained in a variety of different manners. For example, the device can be identified in metadata of the key, the protected content can include metadata identifying the key and the device, the content protection system can maintain a list or other record associating the identifier with the key, and so forth.

The protected content and the key are roamed to one or more additional devices (act 514). The protected content, as well as a data protection private key, can be roamed to different computing devices as discussed above, and can be roamed via cloud storage or other mechanisms (e.g., a peer-to-peer transfer). In situations in which the key is the file encryption key, the file encryption key can be roamed to different computing devices analogous to the manner in which the data protection private key is roamed as discussed above, or alternatively can be provided to the computing devices in other manners (e.g., by a system administrator).

Subsequent to roaming the protected content and the key, a management-initiated wipe command is received, and a wipe command indicating to delete the key is roamed (act 516). The management-initiated wipe command can be received from a management source as discussed above, such as a system administrator, a system controller or management device, etc. The wipe command can be roamed via the cloud storage in an analogous manner to roaming content via the cloud storage as discussed above. The wipe command can be roamed by a content synchronization program, or alternatively by a content protection system of the computing devices. For example, wipe commands received at a computing device can be copied to the cloud storage by a content protection system of the computing device for retrieval by the content protection systems of other computing devices.

Additionally or alternatively, the wipe command can be roamed using any of a variety of other types of communication channels or transfer mechanisms. For example, the wipe command can be transferred through a specific server or a peer-to-peer mechanism or network such as Bluetooth, NFC, a LAN, a cellular network, and so forth. By way of another example, the wipe command can be transferred through different types of devices, such as a USB Flash memory drive.

As discussed above, the key on which retrieval of the content is based is associated with one or more identifiers each of which denotes a device providing the key. This identifier can change for different devices, or additional identifiers can be associated with the protected content, as the protected content is roamed to different devices.

Figure 6:
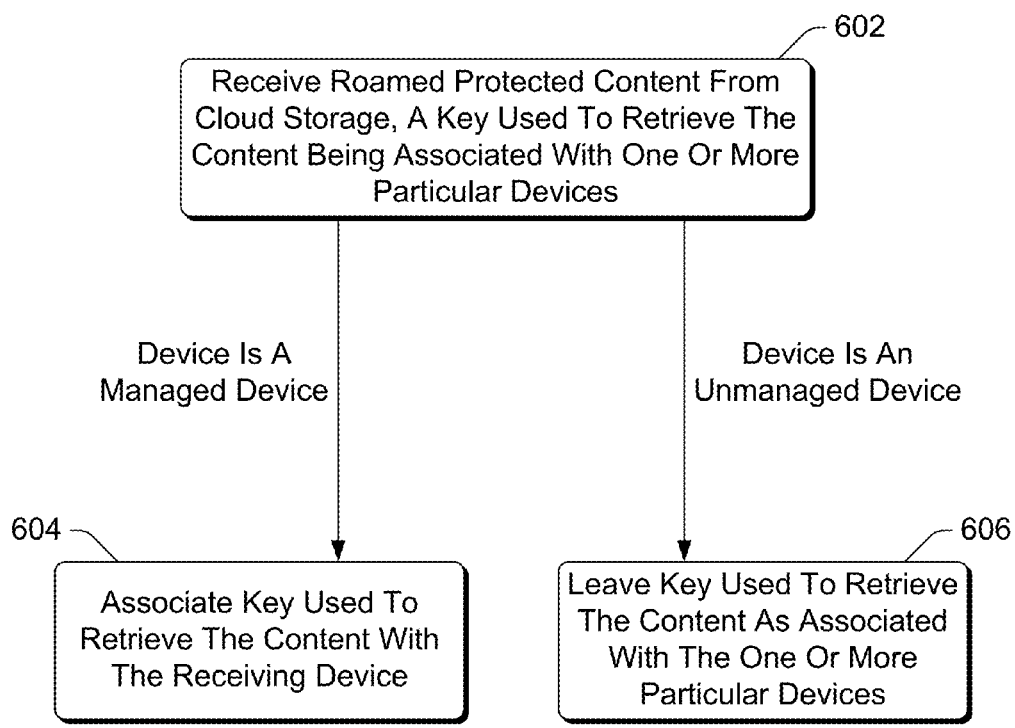
FIG. 6 is a flowchart illustrating an example process for setting the identifier denoting the device providing a key as content is roamed across devices in accordance with one or more embodiments.

FIG. 6 is a flowchart illustrating an example process 600 for setting the identifier denoting the device providing a key as content is roamed across devices in accordance with one or more embodiments. Process 600 is carried out by a content protection system, such as the content protection system 104 of FIG. 1 or FIG. 2, and can be implemented in software, firmware, hardware, or combinations thereof. Process 600 is shown as a set of acts and is not limited to the order shown for performing the operations of the various acts. Process 600 is an example process for setting the identifier denoting the device providing a key as content is roamed across devices; additional discussions of setting the identifier denoting the device providing a key as content is roamed across devices are included herein with reference to different figures.

In process 600, protected content roamed from cloud storage is received (act 602). A key used to retrieve the received protected content can be associated with a particular device, or alternatively multiple different devices (all of which are managed devices). This key can be a file encryption key or a data protection private key, as discussed above.

Process 600 proceeds based on whether the computing device receiving the protected content is a managed device or an unmanaged device. If the computing device receiving the protected content is a managed device, then the key used to retrieve the content is associated with the receiving device (act 604). It should be noted that this associating may include encrypting certain content or keys. For example, if the key is a data protection private key, then this association can include encrypting the file encryption key with the data protection public key of the receiving device.

However, if the computing device receiving the protected content is an unmanaged device, then the key used to retrieve the content is left as associated with the particular one or more devices (act 606). Thus, in act 606 the association of the key with the particular one or more devices is maintained in the absence of associating the key with the unmanaged device receiving the protected content (the key is not associated with the unmanaged device receiving the protected content).

The associating of the key with an identifier of a managed device, and maintaining this association when the content is roamed to an unmanaged device, creates a management channel for the key (and the content) to the unmanaged device. The management channel refers to a channel or mechanism via which an indication of a wipe command can be provided to the unmanaged device. It should be noted that there can be multiple management channels for the same key to the same unmanaged device. Thus, although a direct channel back to the management source is not available to the unmanaged device, a management channel to the unmanaged device via which a wipe command can be provided to the unmanaged device does exist.

In one or more embodiments, in act 604 the key used to retrieve the content is transitioned to be associated with the receiving device, and the identification of the particular device as associated with the key is replaced with an identification of the receiving device. Alternatively, the key can be associated with both the particular device and the receiving device. Thus, the key can be associated with multiple devices. In order to avoid potentially deleting the key unnecessarily when there is still a management channel (a direct channel or other management channel), the key can be associated with multiple devices, particularly the devices that have a direct channel back to the management source and that can synchronize with the unmanaged device. For example, consider the situation where an unmanaged device is in a synchronization relationship with two other managed devices. If a wipe command is device specific, then the unmanaged device would not need to delete the key so long as a managed device is still synchronizing with the unmanaged device, but would just delete the reference to the wiped device when the wipe command from that device is received. When all references from all synchronizing management channels have been deleted then the key is deleted on the unmanaged device as well. Alternatively, a wipe command can identify multiple devices (optionally without specifically identifying any devices, such as using a "wipe all" command), in which case the unmanaged device does delete the key regardless of how many (if any) managed devices are still synchronizing with the unmanaged device.

Figure 7:
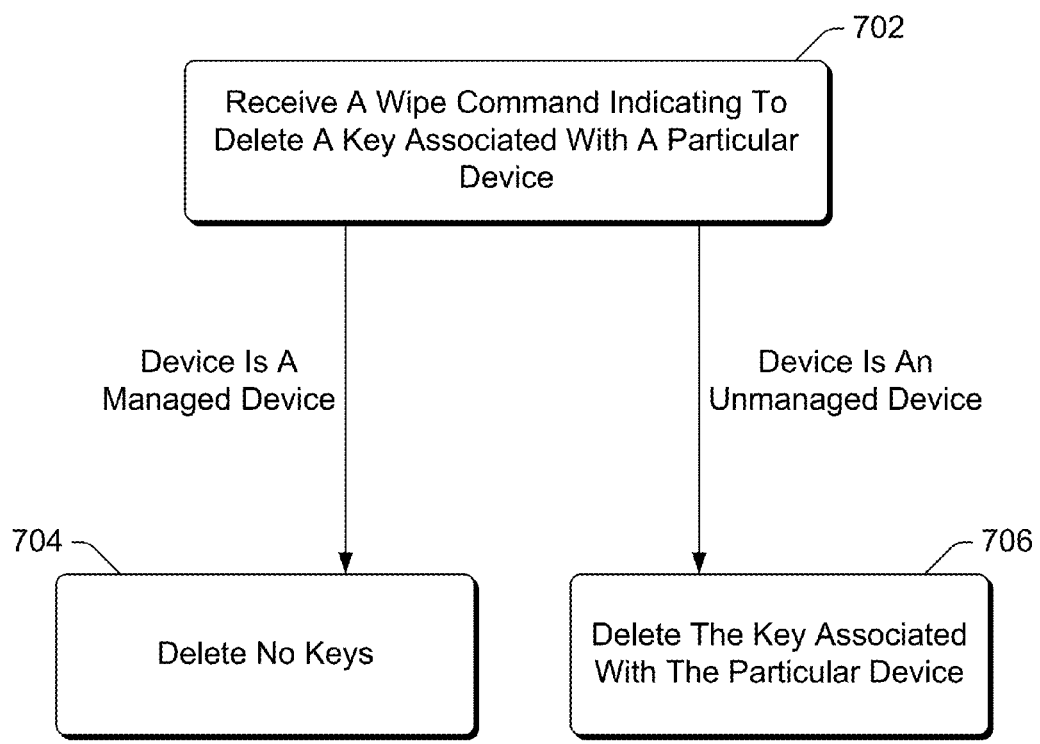
FIG. 7 is a flowchart illustrating an example process for acting on roamed wipe commands in accordance with one or more embodiments.

FIG. 7 is a flowchart illustrating an example process 700 for acting on roamed wipe commands in accordance with one or more embodiments. Process 700 is carried out by a content protection system, such as the content protection system 104 of FIG. 1 or FIG. 2, and can be implemented in software, firmware, hardware, or combinations thereof. Process 700 is shown as a set of acts and is not limited to the order shown for performing the operations of the various acts. Process 700 is an example process for acting on roamed wipe commands; additional discussions of acting on roamed wipe commands are included herein with reference to different figures.

In process 700, a wipe command indicating to delete a key associated with a particular computing device is received (act 702). The received wipe command is a roamed wipe command—the wipe command is received from another device that synchronizes with the receiving device rather than from a management source. This key is a key used to retrieve the received protected content, and can be a file encryption key or a data protection private key as discussed above.

Process 700 proceeds based on whether the computing device receiving the wipe command is a managed device or an unmanaged device. If the computing device receiving the wipe command is a managed device, then no keys are deleted from the receiving device (act 704). In one or more embodiments, even though protected content may have been received for which the key was associated with the particular device, that association was changed at the receiving device. Thus, at the receiving device the key would no longer be associated with the particular device. Alternatively, if the key is associated with the particular device and the receiving device, the reference to or identification of the particular device is deleted in act 704, although the key is not deleted because the key is still associated with the receiving device.

However, if the computing device receiving the wipe command is an unmanaged device, then the key associated with the particular device is deleted (act 706). Thus, even though the device is unmanaged, the wipe command roams to the unmanaged device, and the key is deleted. Alternatively, the key may only be deleted on the unmanaged device if all the particular devices associated with the key and which communicate with the computing device are wiped; if there is still a management channel to the unmanaged device, the key is not deleted (unless a "wipe all" command is received).

Figure 8:
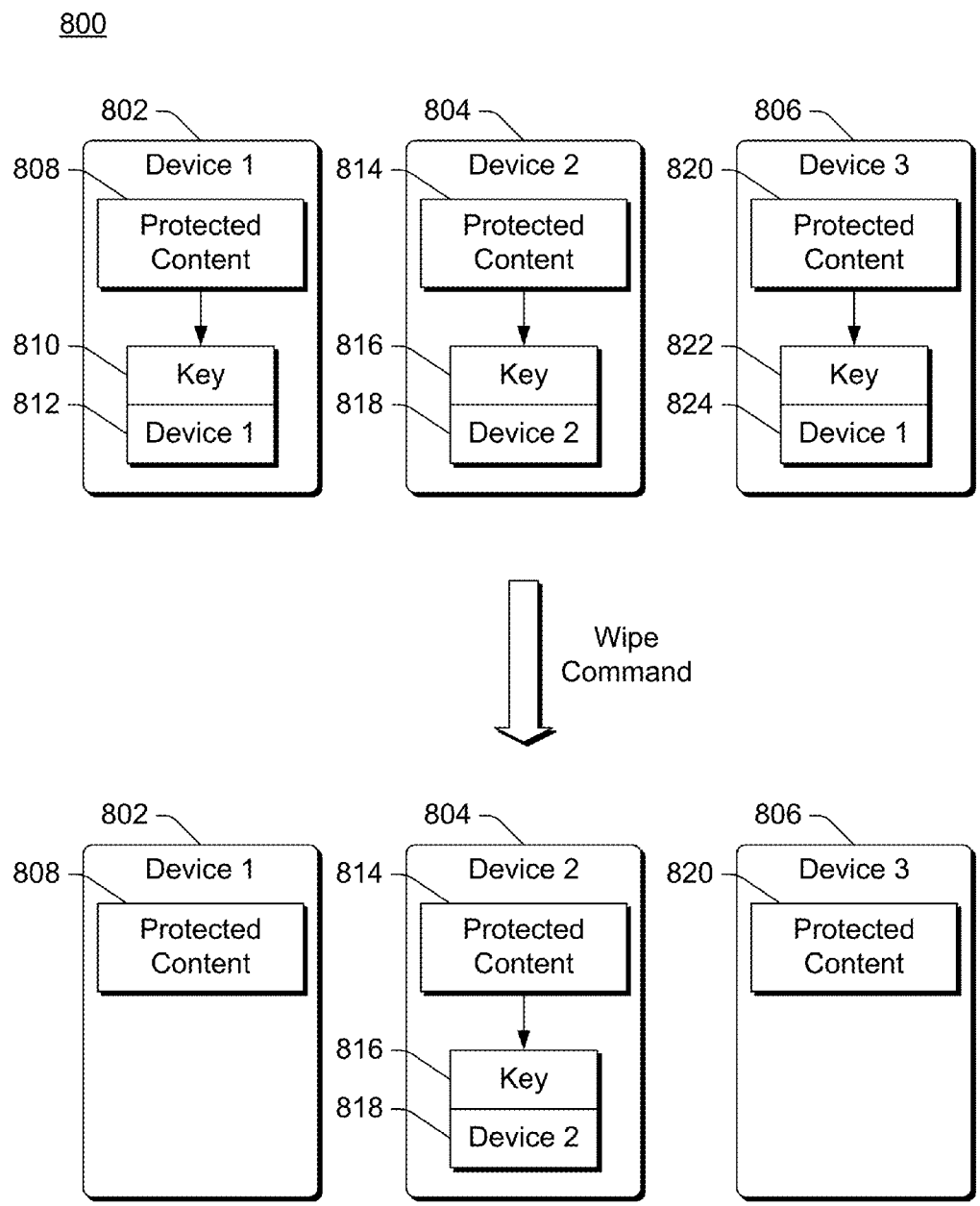
FIGS. 8 and 9 illustrate examples of wiping content in accordance with one or more embodiments.

FIG. 8 illustrates an example of wiping content in accordance with one or more embodiments. Assume that protected content is roamed across three computing devices 802, 804, and 806. The computing devices 802 and 804 are both managed by the same management policy, and the computing device 806 is unmanaged. Further assume that protected content 808 is created on the computing device 802, and roams to the computing devices 804 and 806. When the protected content 808 is created, a key 810 on which retrieval of the content is based is associated with an identifier 812 of the computing device 802. When the protected content 808 is roamed to the computing device 804, the protected content is stored as protected content 814. Because the computing device 804 is a managed device, the association of the key is changed on the computing device 804, and a key 816 on which retrieval of the content is based is associated with an identifier 818 of the computing device 804. Although the association is changed on the computing device 804, this change does not alter the association on the computing device 802. When the protected content 808 is roamed to the computing device 806, the protected content is stored as protected content 820. Because the computing device 806 is an unmanaged device, the association of the key is not changed. Thus, a key 822 on which retrieval of the content is based is associated with an identifier 824 of the computing device 802.

In response to a subsequent wipe command (received from a management source by one of the managed computing devices 802 or 804, and roamed to the unmanaged computing device 806 and optionally the other managed computing device 802 or 804) indicating to delete the key associated with the computing device 802, the wipe command is received by the computing devices 802, 804, and 806. The key 810 associated with the identifier 812 of the computing device 802 is deleted from the computing device 802, and the key 822 associated with the identifier 824 of the computing device 802 is deleted from the computing device 806. However, the key 816 associated with the identifier 818 of the computing device 804 remains on the computing device 804. Thus, in response to the wipe command, the protected content can no longer be retrieved at the computing devices 802 and 806 because the computing devices 802 and 806 no longer have the key on which retrieval is based. However, the protected content can still be retrieved at the computing device 804. It should be noted that although the protected content 808 and 820 may remain on the computing devices 802 and 806, the plaintext content cannot be retrieved at the computing devices 802 and 806 because the computing devices 802 and 806 no longer have the key on which retrieval is based.

Figure 9:
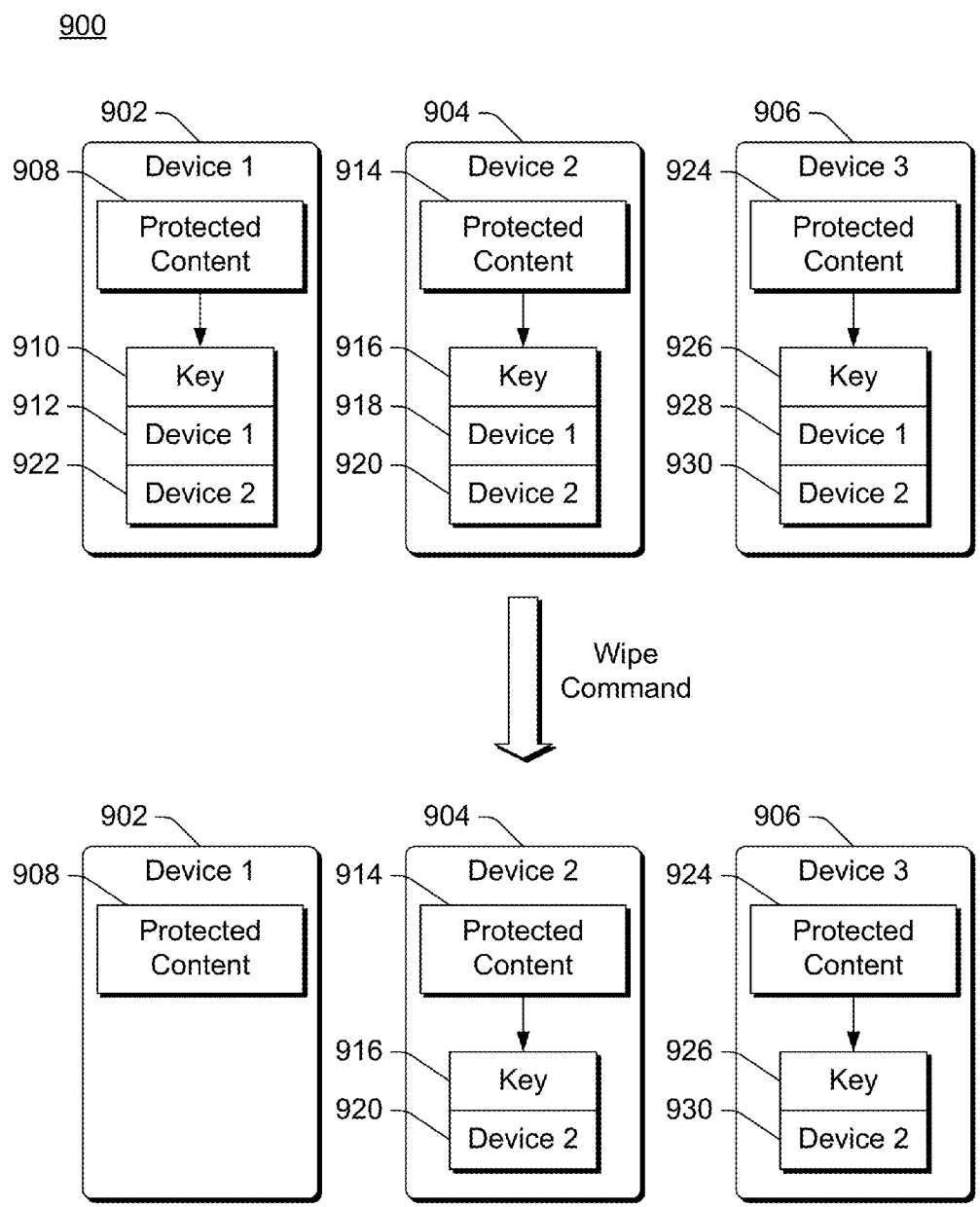

FIG. 9 illustrates another example of wiping content in accordance with one or more embodiments. The example of FIG. 9 is similar to the example of FIG. 8, however, in the example of FIG. 8 the key on which retrieval of the protected content is based can be associated with identifiers of multiple computing devices. Assume that protected content is roamed across three computing devices 902, 904, and 906. The computing devices 902 and 904 are both managed by the same management policy, and the computing device 906 is unmanaged. Further assume that protected content 908 is created on the computing device 902, and roams to the computing devices 904 and 906, and also that the protected content 908 is revised (edited) on the computing device 904 and the revised protected content is roamed to the computing devices 902 and 906.

When the protected content 908 is created, a key 910 on which retrieval of the content is based is associated with an identifier 912 of the computing device 902. When the protected content 908 is roamed to the computing device 904, the protected content is stored as protected content 914. Because the computing device 904 is a managed device, the key is associated with both the computing device 902 and the computing device 904, and a key 916 on which retrieval of the content is based is associated with an identifier 918 of the computing device 902 and an identifier 920 of the computing device 904. When the protected content 914 is revised on the computing device 904, the revised protected content 908 is stored on the computing device 902. Because the computing device 902 is a managed device, the key is associated with both the computing device 902 and the computing device 904, and the key 910 is associated with the identifier 912 of the computing device 902 as well as an identifier 922 of the computing device 904.

When the protected content 908 is roamed to the computing device 906, the protected content is stored as protected content 924. Because the computing device 906 is an unmanaged device, the association of the key is not changed. Thus, a key 926 on which retrieval of the content is based is associated with an identifier 928 of the computing device 902 and an identifier 930 of the computing device 904.

In response to a subsequent wipe command (received from a management source by one of the managed computing devices 902 or 904, and roamed to the unmanaged computing device 906 and optionally the other managed computing device 902 or 904) indicating to delete the key associated with the computing device 902 (e.g., wipe the computing device 902), the wipe command is received by the computing devices 902, 904, and 906. In one or more embodiments, the key 910 associated with the identifier 912 of the computing device 902 is deleted from the computing device 902 because the command is to delete the key from the computing device 902. Alternatively, identifier 912 can be deleted from the computing device 902, and the key 910 associated with the identifier 922 of the computing device 904 can remain on the computing device 902.

The identifier 918 of the computing device 902 is deleted from the computing device 904, but the key 916 and the identifier 920 of the computing device 904 remain on the computing device 904. Similarly, the identifier 928 of the computing device 902 is deleted from the computing device 906, but the key 926 and the identifier 930 of the computing device 904 remain on the computing device 906. However, if the wipe command had been a command to wipe all of the devices, or an additional wipe command to delete the key associated with the computing device 904 (e.g., wipe the computing device 904) were to be received, then the key 916 and the identifier 920 would be deleted from the computing device 904, and the key 926 and the identifier 930 would be deleted from the computing device 906.

Thus, as can be seen from the discussions herein, as protected content is roamed to different devices the key used to retrieve the protected content remains associated with the particular device that generated the key until the protected content roams to a managed device. This allows wipe commands to be roamed to other computing devices, and keys on unmanaged devices to be deleted while keys on managed devices can remain. This advantageously allows keys to be deleted from some devices (e.g., devices that have been lost or stolen, or unmanaged devices that obtained protected content from a device that has been lost or stolen), while at the same time allowing content to remain on other managed devices (e.g., that have not been lost or stolen) and/or allow content to remain on unmanaged devices until the key has been revoked from all associated devices that synchronize with the unmanaged device. This also advantageously allows a wipe command to be roamed to an additional managed device, resulting in the key being wiped from the additional managed device in the absence of the additional managed device receiving a wipe command directly from a server or controller that initiated the wipe command.

These techniques for associating keys with devices and roaming wipe commands effectively extend the management of data to unmanaged devices, allowing data to be wiped from unmanaged devices. In one or more embodiments, these techniques give precedence to the computing device with the most recent roaming event from a managed device. Alternatively, various different management redundancy, prioritization, and conflict resolution techniques can be employed in situations where multiple managing entities (e.g., different management policies) exist. Such techniques can include duplicating keys and associating duplicated keys with a new device identifier (e.g., creating lists of key/device identifier pairs), associating multiple management channels or device tags with a single key, and so forth.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 10:
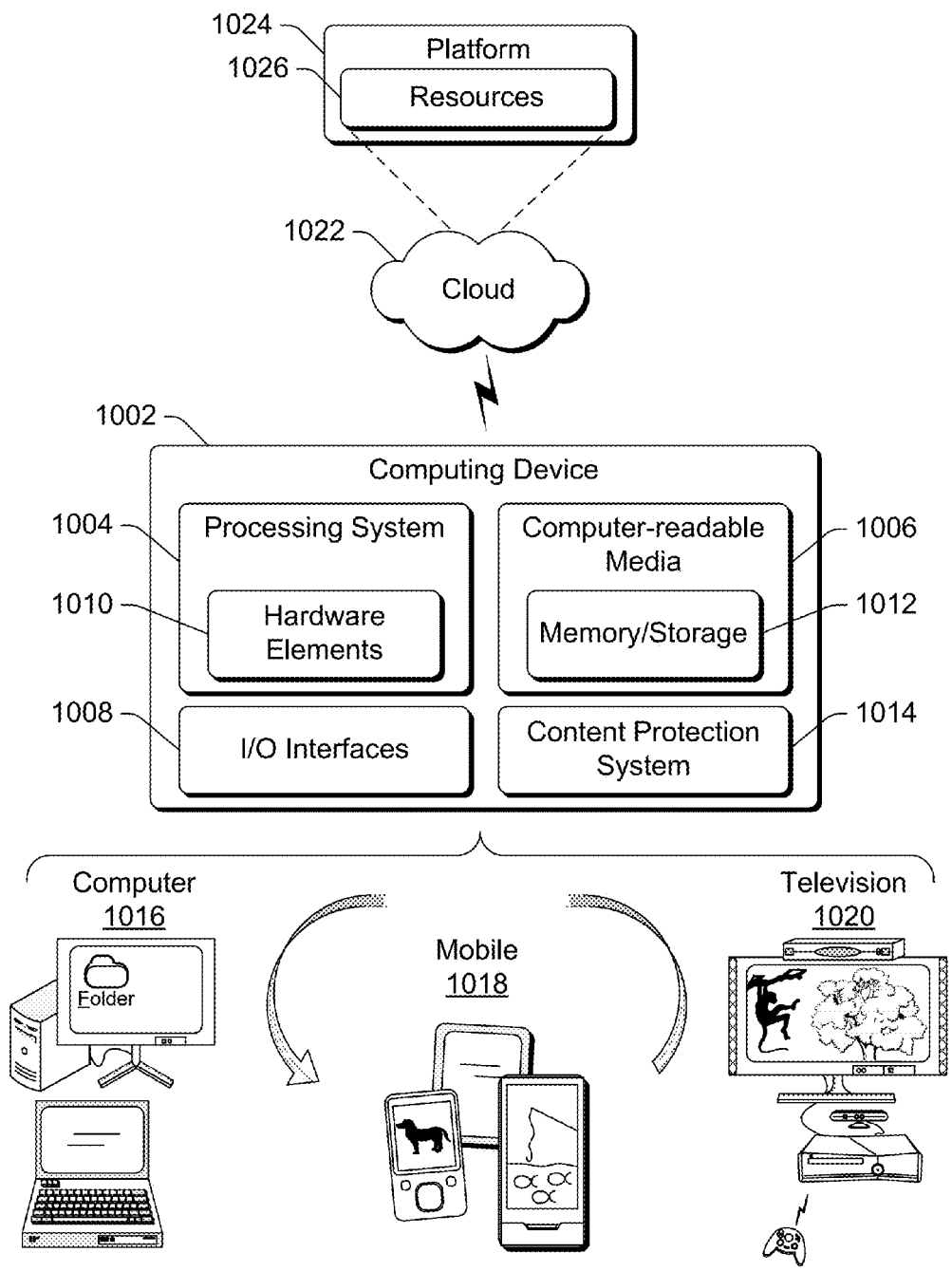
FIG. 10 illustrates an example system that includes an example computing device that is representative of one or more systems and/or devices that may implement the various techniques described herein.

FIG. 10 illustrates an example system generally at 1000 that includes an example computing device 1002 that is representative of one or more systems and/or devices that may implement the various techniques described herein. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O Interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

The one or more input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Computing device 1002 also includes a content protection system 1014. The content protection system 1014 provides various protection of content, including keys, as discussed above. The content protection system 1014 can implement, for example, the content protection system 104 of FIG. 1 or FIG. 2.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 1010 and computer-readable media 1006 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of modules as a module that is executable by the computing device 1002 as software may be achieved at least partially in hardware, e.g., through use of computer-readable storage media and/or hardware elements 1010 of the processing system. The instructions and/or functions may be executable/operable by one or more articles of manufacture (for example, one or more computing devices 1002 and/or processing systems 1004) to implement techniques, modules, and examples described herein.

As further illustrated in FIG. 10, the example system 1000 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1000, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 1002 may assume a variety of different configurations, such as for computer 1016, mobile 1018, and television 1020 uses. Each of these configurations includes devices that may have generally different constructs and capabilities, and thus the computing device 1002 may be configured according to one or more of the different device classes. For instance, the computing device 1002 may be implemented as the computer 1016 class of a device that includes a personal computer, desktop computer, a multi-screen computer, laptop computer, netbook, and so on.

The computing device 1002 may also be implemented as the mobile 1018 class of device that includes mobile devices, such as a mobile phone, portable music player, portable gaming device, a tablet computer, a multi-screen computer, and so on. The computing device 1002 may also be implemented as the television 1020 class of device that includes devices having or connected to generally larger screens in casual viewing environments. These devices include televisions, set-top boxes, gaming consoles, and so on.

The techniques described herein may be supported by these various configurations of the computing device 1002 and are not limited to the specific examples of the techniques described herein. This functionality may also be implemented all or in part through use of a distributed system, such as over a cloud 1022 via a platform 1024 as described below.

The cloud 1022 includes and/or is representative of a platform 1024 for resources 1026. The platform 1024 abstracts underlying functionality of hardware (e.g., servers) and software resources of the cloud 1022. The resources 1026 may include applications and/or data that can be utilized while computer processing is executed on servers that are remote from the computing device 1002. Resources 1026 can also include services provided over the Internet and/or through a subscriber network, such as a cellular or Wi-Fi network.

The platform 1024 may abstract resources and functions to connect the computing device 1002 with other computing devices. The platform 1024 may also serve to abstract scaling of resources to provide a corresponding level of scale to encountered demand for the resources 1026 that are implemented via the platform 1024. Accordingly, in an interconnected device embodiment, implementation of functionality described herein may be distributed throughout the system 1000. For example, the functionality may be implemented in part on the computing device 1002 as well as via the platform 1024 that abstracts the functionality of the cloud 1022.

In the discussions herein, various different embodiments are described. It is to be appreciated and understood that each embodiment described herein can be used on its own or in connection with one or more other embodiments described herein. Any of the devices, methods, and so forth discussed herein can be used in conjunction with any other devices, methods, and so forth discussed herein. Further aspects of the techniques discussed herein relate to one or more of the following embodiments.

A method implemented a first computing device, the method comprising: receiving, from a second computing device, content protected based on a key, the content having been encrypted, and the key being associated with a third computing device that is being managed by a management policy; and determining whether the first computing device is being managed by the management policy, wherein: in response to determining that the first computing device is being managed by the management policy the method further includes associating the key with the first computing device; and in response to determining that the first computing device is being unmanaged by the management policy the method further includes maintaining the association of the key with the third computing device.

Alternatively or in addition to the above described method, any one or combination of: the receiving comprising receiving the protected content from the second computing device via cloud storage; the first computing device, the second computing device, and the third computing device being three separate computing devices; the key comprising a file encryption key, and the content having been encrypted using the file encryption key; the key comprising a data protection private key of a data protection public/private key pair, the content having been encrypted using a file encryption key, and the file encryption key having been encrypted using a data protection public key of the data protection public/private key pair; the method further comprising receiving a wipe command indicating a command to delete the key associated with the third computing device, and deleting, at the first computing device and in response to the first computing device being unmanaged by the management policy, the key associated with the third computing device; the method further comprising: receiving a wipe command indicating a command to delete the key associated with the third computing device, and deleting, at the first computing device and in response to the first computing device being unmanaged by the management policy and the key being associated at the first computing device with multiple computing devices, an indication of the association of the third computing device with the key, but not deleting the key from the first computing device.

A first computing device comprising: a content synchronization program configured to receive, from a second computing device, content protected based on a key, the content having been encrypted, and the key being associated with a third computing device that is being managed by a management policy; and a key management module configured to determine whether the first computing device is being managed by the management policy, wherein: in response to determining that the first computing device is being managed by the management policy the key management module is further configured to associate the key with the first computing device; and in response to determining that the first computing device is being unmanaged by the management policy the key management module is further configured to maintain the association of the key with the third computing device in the absence of associating the key with the first computing device.

Alternatively or in addition to the above described computing device, any one or combination of: the content synchronization program being further configured to receive the protected content from the second computing device via a cloud service; the first computing device, the second computing device, and the third computing device being three separate computing devices; the key comprising a file encryption key, and the content having been encrypted using the file encryption key; the key comprising a data protection private key of a data protection public/private key pair, the content having been encrypted using a file encryption key, and the file encryption key having been encrypted using a data protection public key of the data protection public/private key pair; the key management module being further configured to: receive a wipe command indicating a command to delete the key associated with the third computing device, determine, in response to the first computing device being unmanaged by the management policy, whether the key is associated on the first computing device with multiple computing devices, delete, at the first computing device and in response to the first computing device being unmanaged by the management policy and the key being associated with only the third computing device, the key associated with the third computing device, and delete, at the first computing device and in response to the first computing device being unmanaged by the management policy and the key being associated with multiple computing devices, an identifier of the third computing device but keeping the key associated with at least one other of the multiple computing devices; the key management module being further configured to receive the wipe command from the second computing device.

A method implemented in a first computing device, the method comprising: obtaining content at the first computing device, the first computing device being managed by a management policy; protecting the content so that the content is configured to be retrieved based on a key, the protecting including encrypting the content; associating the key with an identifier of the first computing device; roaming the encrypted content and the key to a second computing device, the second computing device being an unmanaged device that is not managed by the management policy; and subsequently communicating, to the second computing device and in response to receiving a management-initiated wipe command, a wipe command indicating to the second computing device to delete the key.

Alternatively or in addition to any one or more of the above described methods, any one or combination of: the key comprising a file encryption key, and the protecting comprising encrypting the content with the file encryption key; the key comprising a data protection private key of a data protection public/private key pair, the protecting comprising encrypting the content with a file encryption key, and encrypting the file encryption key with a data protection public key of the data protection public/private key pair; the method further comprising receiving, from a third computing device that is being managed by the management policy, content protected based on a key associated with the third computing device, the content having been encrypted, in response to determining that the first computing device being is being managed by the management policy the method further includes associating the key with the third computing device as well as with the first computing device, and in response to determining that the first computing device is being unmanaged by the management policy the method further includes maintaining the association of the key with the third computing device in the absence of associating the key with the first computing device; the roaming comprising roaming the encrypted content and the key to the second computing device via a cloud service or peer to peer communication; the communicating comprising communicating the wipe command to the second computing device via the cloud service.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a first computing device, the method comprising:
   receiving, from a second computing device, content protected based on a key, the content having been encrypted, and the key being associated with a third computing device that is being managed by a management policy; and
   determining whether the first computing device is being managed by the management policy, wherein:
      in response to determining that the first computing device is being managed by the management policy the method further includes associating, by the first computing device, the key with the first computing device; and
      in response to determining that the first computing device is not being managed by the management policy the method further includes:
         maintaining, at the first computing device, the association of the key with the third computing device rather than associating the key with the first computing device; and
         using the key associated with the third computing device to retrieve plaintext content from the protected content.

2. The method as recited in claim 1, the receiving comprising receiving the protected content from the second computing device via cloud storage.

3. The method as recited in claim 1, the first computing device, the second computing device, and the third computing device being three separate computing devices.

4. The method as recited in claim 1, the key comprising a file encryption key, and the content having been encrypted using the file encryption key.

5. The method as recited in claim 1, the key comprising a data protection private key of a data protection public/private key pair, the content having been encrypted using a file encryption key, and the file encryption key having been encrypted using a data protection public key of the data protection public/private key pair.

6. The method as recited in claim 1, further comprising:
   receiving a wipe command indicating a command to delete the key associated with the third computing device;
   determining that the key is associated with only the third computing device; and
   deleting, at the first computing device and in response to the first computing device not being managed by the management policy and the key being associated with only the third computing device, the key associated with the third computing device.

7. The method as recited in claim 1, further comprising:
receiving a wipe command indicating a command to delete the key associated with the third computing device;
determining that the key is associated with multiple computing devices; and
deleting, at the first computing device and in response to the first computing device not being managed by the management policy and the key being associated at the first computing device with the multiple computing devices, an indication of the association of the third computing device with the key, but not deleting the key from the first computing device.

8. A first computing device comprising:
a content synchronization program configured to receive, from a second computing device, content protected based on a key, the content having been encrypted, and the key being associated with a third computing device that is being managed by a management policy; and
a key management module configured to determine whether the first computing device is being managed by the management policy, wherein:
in response to determining that the first computing device is being managed by the management policy the key management module is further configured to associate the key with the first computing device;
in response to determining that the first computing device is not being managed by the management policy the key management module is further configured to maintain the association of the key with the third computing device rather than associate the key with the first computing device;
in response to receiving a wipe command indicating a command to delete the key associated with the third computing device, determine whether the key is associated on the first computing device with multiple computing devices, wherein:
in response to determining that the key is associated with only the third computing device, delete the key at the first computing device;
in response to determining that the key is associated with multiple computing devices, delete an identifier of the third computing device from the key at the first computing device while maintaining an association of the key with at least one other of the multiple computing devices.

9. The first computing device as recited in claim 8, the first computing device, the second computing device, and the third computing device being three separate computing devices.

10. The first computing device as recited in claim 8, the key comprising a file encryption key, and the content having been encrypted using the file encryption key.

11. The first computing device as recited in claim 8, the key comprising a data protection private key of a data protection public/private key pair, the content having been encrypted using a file encryption key, and the file encryption key having been encrypted using a data protection public key of the data protection public/private key pair.

12. The first computing device as recited in claim 8, wherein the wipe command is received from the second computing device.

13. A method implemented in a first computing device, the method comprising:

obtaining content at the first computing device, the first computing device being managed by a management policy;
protecting the content so that the content is configured to be retrieved based on a key, the protecting including encrypting the content;
associating, by the first computing device, the key with an identifier of the first computing device;
roaming the encrypted content and the key to a second computing device, the second computing device being an unmanaged device that is not managed by the management policy;
associating, by the first computing device, the key with an identifier of a third computing device from which the content is obtained;
in response to receiving a management-initiated wipe command indicating a command to delete the key associated with the third computing device:
determining whether the key is associated on the first computing device with multiple computing devices;
in response to determining that the key is associated with multiple computing devices, deleting an identifier of the third computing device from the key at the first computing device while maintaining an association of the key with at least one other of the multiple computing devices; and
subsequently communicating, to the second computing device and in response to receiving the management-initiated wipe command, a wipe command indicating to the second computing device to delete the key.

14. The method as recited in claim 13, the key comprising a file encryption key, and the protecting comprising encrypting the content with the file encryption key.

15. The method as recited in claim 13, the key comprising a data protection private key of a data protection public/private key pair, the protecting comprising:
encrypting the content with a file encryption key; and
encrypting the file encryption key with a data protection public key of the data protection public/private key pair.

16. The method as recited in claim 13, further comprising:
receiving, from a fourth computing device that is being managed by the management policy, second content protected based on a second key associated with the fourth computing device, the second content having been encrypted;
in response to determining that the first computing device is being managed by the management policy, associating the second key with the fourth computing device as well as with the first computing device; and
in response to determining that the first computing device is not managed by the management policy, maintaining the association of the second key with the fourth computing device in the absence of associating the second key with the first computing device.

17. The method as recited in claim 13, the roaming comprising roaming the encrypted content and the key to the second computing device via a cloud service or peer to peer communication.

18. The method as recited in claim 17, the communicating comprising communicating the wipe command to the second computing device via the cloud service.

19. The method as recited in claim 1, further comprising:
receiving, from a fourth computing device that is being managed by the management policy, second content protected based on a second key associated with the fourth computing device, the second content having been encrypted;

in response to determining that the first computing device is being managed by the management policy, associating the second key with the fourth computing device as well as with the first computing device; and in response to determining that the first computing device is not managed by the management policy, maintaining the association of the second key with the fourth computing device in the absence of associating the second key with the first computing device.

20. The first computing device as recited in claim 8, the key management module being further configured to use the key associated with the third computing device to retrieve plaintext content from the protected content.

* * * * *